(12) United States Patent
Retterath

(10) Patent No.: US 11,514,594 B2
(45) Date of Patent: Nov. 29, 2022

(54) COMPOSITE IMAGING SYSTEMS USING A FOCAL PLANE ARRAY WITH IN-PIXEL ANALOG STORAGE ELEMENTS

(71) Applicant: Vergence Automation, Inc., Excelsior, MN (US)

(72) Inventor: James E. Retterath, Excelsior, MN (US)

(73) Assignee: Vergence Automation, Inc., Chaska, MN (US)

(*) Notice: Subject to any disclaimer, the term of this patent is extended or adjusted under 35 U.S.C. 154(b) by 0 days.

(21) Appl. No.: 16/668,077

(22) Filed: Oct. 30, 2019

(65) Prior Publication Data

US 2021/0133993 A1    May 6, 2021

(51) Int. Cl.
*G06T 7/521* (2017.01)
*H04N 5/225* (2006.01)
(Continued)

(52) U.S. Cl.
CPC ............ *G06T 7/521* (2017.01); *G01S 17/894* (2020.01); *G06T 7/246* (2017.01); *H04N 5/2253* (2013.01);
(Continued)

(58) Field of Classification Search
CPC .............. G06T 7/521; G06T 7/246; G06T 2207/10028; G06T 2207/10152;
(Continued)

(56) References Cited

U.S. PATENT DOCUMENTS 6,765,566 B1 * 7/2004 Tsao .................... H04N 13/393
345/419
7,634,061 B1   12/2009 Turner et al.
(Continued)

FOREIGN PATENT DOCUMENTS

DE    102018107801 A1    10/2018
KR    10-2016-0135482 A    11/2016
(Continued)

OTHER PUBLICATIONS

Bie et al., A MoTe2-Based Light-Emitting Diode and Photodetecto for Silicon Phototonic Integated Circuits, Nature Nanotechnology, Oct. 23, 2017, 8 pages.
(Continued)

*Primary Examiner* — Joseph G Ustaris
*Assistant Examiner* — Jimmy S Lee
(74) *Attorney, Agent, or Firm* — Patterson Thuente IP

(57) ABSTRACT

Various embodiments of a 3D+imaging system include a focal plane array with in-pixel analog storage elements. In embodiments, an analog pixel circuit is disclosed for use with an array of photodetectors for a sub-frame composite imaging system. In embodiments, a composite imaging system is capable of determining per-pixel depth, white point and black point for a sensor and/or a scene that is stationary or in motion. Examples of applications for the 3D+imaging system include advanced imaging for vehicles, as well as for industrial and smart phone imaging. an extended dynamic range imaging technique is used in imaging to reproduce a greater dynamic range of luminosity.

12 Claims, 18 Drawing Sheets

(51) Int. Cl.
*G06T 7/246* (2017.01)
*H04N 13/254* (2018.01)
*G01S 17/894* (2020.01)

(52) U.S. Cl.
CPC . *H04N 13/254* (2018.05); *G06T 2207/10028* (2013.01); *G06T 2207/10152* (2013.01); *G06T 2207/20212* (2013.01); *G06T 2207/30252* (2013.01)

(58) Field of Classification Search
CPC ........... G06T 2207/20212; G06T 2207/30252; H04N 13/254; H04N 5/2253; G01S 17/894
USPC .......................................................... 348/46
See application file for complete search history.

(56) References Cited

U.S. PATENT DOCUMENTS

| | | | |
|---|---|---|---|
| 8,102,426 B2 | 1/2012 | Yahav et al. |
| 8,150,902 B2 | 4/2012 | Bates |
| 8,543,254 B1 | 9/2013 | Schut et al. |
| 8,629,387 B2 | 1/2014 | Pflibsen et al. |
| 9,094,628 B2 | 7/2015 | Williams |
| 9,185,363 B2 | 11/2015 | Murillo Amaya et al. |
| 9,189,689 B2 | 11/2015 | Chandraker et al. |
| 9,280,711 B2 | 3/2016 | Stein |
| 9,294,754 B2 | 3/2016 | Billerbeck et al. |
| 9,325,920 B2 | 4/2016 | Van Nieuwenhove et al. |
| 9,367,922 B2 | 6/2016 | Chandraker et al. |
| 9,513,768 B2 | 12/2016 | Zhao et al. |
| 9,514,373 B2 | 12/2016 | Jeromin et al. |
| 9,524,434 B2 | 12/2016 | Gee et al. |
| 9,607,377 B2 | 3/2017 | Lovberg et al. |
| 9,651,388 B1 | 5/2017 | Chapman et al. |
| 9,671,243 B2 | 6/2017 | Stein |
| 9,671,328 B2 | 6/2017 | Retterath et al. |
| 9,734,414 B2 | 8/2017 | Samarasekera et al. |
| 9,778,352 B2 | 10/2017 | Mizutani |
| 9,797,734 B2 | 10/2017 | Mizutani et al. |
| 9,811,731 B2 | 11/2017 | Lee et al. |
| 9,824,586 B2 | 11/2017 | Sato et al. |
| 9,836,657 B2 | 12/2017 | Hilldore et al. |
| 9,842,254 B1 | 12/2017 | Brailovskiy et al. |
| 9,846,040 B2 | 12/2017 | Hallberg |
| 9,866,816 B2 | 1/2018 | Retterath |
| 9,870,513 B2 | 1/2018 | Thiel et al. |
| 9,870,624 B1 | 1/2018 | Narang et al. |
| 9,902,401 B2 | 2/2018 | Stein et al. |
| 9,905,024 B2 | 2/2018 | Shin et al. |
| 9,928,605 B2 | 3/2018 | Bleiweiss et al. |
| 9,934,690 B2 | 4/2018 | Kuroda |
| 9,940,539 B2 | 4/2018 | Han et al. |
| 9,943,022 B1 | 4/2018 | Alam |
| 9,946,260 B2 | 4/2018 | Shashua et al. |
| 9,953,227 B2 | 4/2018 | Utagawa et al. |
| 9,959,595 B2 | 5/2018 | Livyatan et al. |
| 9,971,953 B2 | 5/2018 | Li et al. |
| 9,981,659 B2 | 5/2018 | Urano et al. |
| 9,984,468 B2 | 5/2018 | Kasahara |
| 9,992,468 B2 | 6/2018 | Osanai et al. |
| 9,996,941 B2 | 6/2018 | Roumeliotis et al. |
| 10,012,504 B2 | 7/2018 | Roumeliotis et al. |
| 10,012,517 B2 | 7/2018 | Protter et al. |
| 10,019,014 B2 | 7/2018 | Prasad et al. |
| 10,019,635 B2 | 7/2018 | Kido et al. |
| 10,025,984 B2 | 7/2018 | Rajkumar et al. |
| 10,037,712 B2 | 7/2018 | Dayal |
| 10,046,770 B1 | 8/2018 | Sabri |
| 10,049,307 B2 | 8/2018 | Pankanti et al. |
| 10,054,517 B2 | 8/2018 | Liu et al. |
| 10,055,854 B2 | 8/2018 | Wan et al. |
| 10,062,010 B2 | 8/2018 | Kutliroff |
| 10,071,306 B2 | 9/2018 | Vandonkelaar |
| 10,073,531 B2 | 9/2018 | Hesch et al. |
| 10,215,856 B1 | 2/2019 | Xu |
| 10,218,913 B2 | 2/2019 | Somasundaram et al. |
| 10,302,768 B2 | 5/2019 | Godbaz et al. |
| 10,382,742 B2 | 8/2019 | Retterath |
| 10,397,552 B2 | 8/2019 | Van Neiuwenhove et al. |
| 2011/0007160 A1* | 1/2011 | Okumura ................. H04N 7/08 348/143 |
| 2014/0126769 A1 | 5/2014 | Reitmayr et al. |
| 2014/0218480 A1* | 8/2014 | Knighton ................. G06K 9/32 348/46 |
| 2014/0347448 A1 | 11/2014 | Hegemann et al. |
| 2016/0189372 A1 | 6/2016 | Lovberg et al. |
| 2016/0255289 A1* | 9/2016 | Johnson ............. H04N 9/04557 348/273 |
| 2017/0230638 A1 | 8/2017 | Wajs et al. |
| 2017/0236037 A1 | 8/2017 | Rhoads et al. |
| 2017/0323429 A1 | 11/2017 | Godbaz et al. |
| 2018/0031681 A1* | 2/2018 | Yoon ..................... G01S 17/894 |
| 2018/0063508 A1 | 3/2018 | Trail et al. |
| 2018/0113200 A1 | 4/2018 | Steinberg et al. |
| 2018/0176514 A1 | 6/2018 | Kirmani et al. |
| 2018/0188059 A1 | 7/2018 | Wheeler et al. |
| 2018/0330526 A1* | 11/2018 | Corcoran ........... H04N 5/23293 |
| 2019/0033448 A1 | 1/2019 | Molnar et al. |
| 2019/0056498 A1 | 2/2019 | Sonn et al. |
| 2019/0230297 A1 | 7/2019 | Knorr et al. |
| 2019/0286153 A1* | 9/2019 | Rankawat ................. G06T 7/11 |
| 2020/0057146 A1* | 2/2020 | Stein ..................... G01S 7/4816 |
| 2020/0278194 A1* | 9/2020 | Kawahito ............... G01S 17/89 |

FOREIGN PATENT DOCUMENTS

| | | |
|---|---|---|
| WO | WO 2018/127789 A1 | 7/2018 |
| WO | WO 2020/198134 A1 | 10/2020 |

OTHER PUBLICATIONS

Dionne et al., "Silicon-Based Plasmonics for On-Chip Phototonics," IEEE Journal, Jan.-Feb. 2010, 13 pages.
Sun et al., "Single-Chip Microprocessor that Communicates Directly Using Light," Nature, Dec. 23, 2015, 29 pages.
Wong, the SCAMP-5 Vision Chip is a Focal-Plane Sensor-Processor (FPSP) developed at the University of Manchester (Carey et al., 2013a).
Martel et al., "Parallel HDR Tone Mapping and Auto-Focus on a Cellular Processor Array Vision Chip," 2016 IEEE International Symposium on Circuits and Systems, May 2016, 4 pages.
Abuelsamid, "Bosch Launches Silicon Carbide Chips to Make Evs More Efficient," Forbes, Oct. 13, 2019, 7 pages. ttps://www.forbes.com/sites/samabuelsamid/2019/10/13/bosch-launches-silicon-carbide-chips-to-make-evs-more-efficient/amp/.
Wong et al., "Analog Vision—Neural Network Inference Acceleration Using Analog SIMD Computation in the Focal Plane," Imperial College London, Diplomarbeit, 2018, 112 pages.
Hall et al., "Guide for Pavement Friction," NCHRP, National Academies of Sciences, Engineering, and Medicine, 2009, 257 pages.
Pinson et al., "Orbital Express Advanced Video Guidance Sensor: Ground Testing, Flight Results and Comparisons," NASA Marshall Space Flight Center, American Institute of Aeronautics and Astronautics, Aug. 2008, 12 pages.
Becker et al., "Smartphone Video Guidance Sensor for Small Satellites," NASA Marshall Space Flight Center, 27th Annual AIAA/USU Conference on Small Satellites, Aug. 2013, 8 pages.
Dudek et al., "A General-Purpose CMOS Vision Chip with a Process-Per-Pixel SIMD Array," Computer Science, 2001, 4 pages.
Peizerat et al., "An Analog Counter Architecture for Pixel-Level ADC," CEA/LETI—MINATEC, 2009, 3 pages.
Evans, "Cascading Individual Analog Counters," Radiant Technologies, Inc., Oct. 2016, 7 pages.
Vijayaraghavan et al., "Design for MOSIS Educational Program (Research)," EE Department, University of Tennessee, [undated], 8 pages.
Torrens, "4QD-TEC: Electronics Circuits Reference Archive Analogue Pulse Counter," [undated], 2 pages.

(56) References Cited

OTHER PUBLICATIONS

Foix et al., "Exploitation of Time-of-Flight (ToF) Camera," IRI Technical Report, 2007, 22 pages.
Dudek, "Adaptive Sensing and Image Processing with a General-Purpose Pixel-Parallel Sensor/Processor Array Integrated Circuit," University of Manchester, 2006, 6 pages.
University of Bonn., "Teaching Cars to Drive with Foresight: Self-Learning Process," Science Daily, Oct. 2019, 4 pages.
Panina et al., "Compact CMOS Analog Counter for SPAD Pixel Arrays," IEEE, Apr. 2014, 5 pages.
Tang et al., "2D Materials for Silicon Photonics," Nature Nanotechnology, Oct. 23, 2017, 2 pages.
Barati et al., "Hot Carrier-Enhanced Interlayer Electron-Hole Pair Multiplication in 2D Semiconductor Heterostructure Photocells," Nature Nanotechnology, Oct. 9, 2017, 7 pages.

\* cited by examiner

COMPOSITE IMAGING SYSTEMS USING A FOCAL PLANE ARRAY WITH IN-PIXEL ANALOG STORAGE ELEMENTS

FIELD OF THE INVENTION

The present disclosure relates to camera and imaging systems. More particularly, the present disclosure relates imaging systems that generate three-dimensional and higher-dimensional composite images with faster and more expansive per pixel data generated by on-chip processing that can include neighbor-in-time analog sub-pixel processing and/or single-pixel motion determination.

BACKGROUND OF THE INVENTION

Three-dimensional (3D) cameras, four-dimensional. (4D) cameras, and related high performance imaging systems, referred to in this disclosure as 3D+ imaging systems, are capable of providing more than just two-dimensional images of a scene. 3D+ imaging systems can provide, for example, distance measurements, motion measurements, and/or photonic measurements for physical objects in a scene. An example of a 3D+ camera system that generates lighting-invariant images is disclosed in U.S. Pat. No. 10,382,742.

One of the earliest on-chip image processing systems was the SCAMP chip. (https://www.semanticscholar.org/paper/A-general-purpose-CMOS-vision-chip-with-a-SIMD-Dudek-Hicks/9562f3b610a912ba4ccac1ae463aad87638b4dc1). The most current version of SCAMP chip is the SCAMP-5 chip which features a high speed analog VLSI image acquisition and low-level image processing system. The architecture of the SCAMP-5 chip is based on a dynamically reconfigurable SIMD processor array that features a massively parallel architecture enabling the computation of programmable mask-based image processing in each pixel. (https://personalpages.manchester.ac.uk/staff/p.dudek/scamp/). The chip can capture raw images up to 10,000 fps and runs low-level image processing at a frame rate of 2,000-5,000 fps.

Various examples of on-chip processing systems for high performance imaging systems are described U.S. Pat. Nos. 8,102,426, 8,629.387, 9,094,628, and 10,218,913, U.S. Publ. Appls. US2019/0033448A1, US2019/0056498A1, and (https://ieeexplore.ieee.org/abstract/document/7527519).

SUMMARY OF THE INVENTION

An imaging system configured to generate a composite image depth map of a scene in accordance with various embodiments comprises at least one emitter configured to emit an active light pulse toward the scene and an array of detectors configured to receive light that includes some of the active light pulse reflected from the scene for a field of view that includes at least a portion of the scene. Control circuitry is operably coupled to the at least one emitter and the array of detectors and to a processing system. The control circuitry is configured to cause the at least one emitter to emit the active light pulse and to cause the array of detectors to receive light to store at least three successive sub-frames of analog data as a sub-frame pixel in one or more sub-frame buffers, wherein each sub-frame pixel has a timing relationship of an emitter/detector cycle for that sub-frame pixel. The processing system configured to analyze the at least three successive sub-frames pixels to determine for a pixel associated with the sub-frame pixels a black point, a white point, and the sub-frame pixel at which the white point occurs, and determine a distance range for each pixel based on the sub-frame pixel at which the white point occurs.

In embodiments, the distance range represented by each sub-frame pixel is defined by an overlap in a duration of the timing relationship of the emitter/detector cycle for that sub-frame pixel. In embodiments, a total distance range of the imaging system is equal to a number of sub-frame pixels per pixel times the distance range of each sub-frame pixel.

In some embodiments, the imaging system is mounted in a vehicle capable of moving at speeds of more than 50 km/hour and all of the three or more sub-frame pixels for each pixel are stored within an imaging window less than 250 µSec. In some embodiments, the imaging system is mounted in a handheld device and the three or more sub-frame pixels for each pixel are stored within an imaging window of less than 2500 µSec.

An imaging system configured to generate a composite image two-axis motion map of a scene at a pixel level in accordance with various embodiments comprises at least one emitter configured to emit an active light pulse toward the scene and an array of detectors configured to receive light that includes some of the active light pulse reflected from the scene for a field of view that includes at least a portion of the scene. Control circuitry is operably coupled to the at least one emitter and the array of detectors and to a processing system. The control circuitry is configured to store a set of at least three successive sub-frames of intensity data as sub-frame pixels in one or more sub-frame buffers, wherein each sub-frame pixel has a timing relationship of an emitter/detector cycle for that sub-frame pixel and each set of sub-frame pixels associated with a unique one of an array of pixels based on a row and a column corresponding to the array of detectors. The processing system is configured to analyze at least three successive sub-frame pixels to determine for each pixel in the array of pixels a black point due to ambient light in the scene and a white point due to the active light pulse reflected from the scene for at least the first sub-frame pixel and the last sub-frame pixel for the set of sub-frame pixels for that pixel, generate a horizontal axis motion value for each pixel relative to a row in the pixel array based on a high-intensity rate of change between that pixel and at least one neighbor pixel in the row; and generate a vertical axis motion value for each pixel relative to a column in the pixel array based on a high-intensity rate of change between that pixel and at least one neighbor pixel in the column.

In embodiments, the processing system determines the high-intensity rate of change by evaluating a sub-frame pixel at which a trapezoid slope of the white point crosses over a trailing edge of the black point for a neighbor pixel in a pixel triplet for a given row or column of the pixel array that has a trapezoid slope that is non-zero.

In some embodiments, a duration of a capture cycle is constant for the at least three successive sub-frame pixels, and an intensity and a duration of the active light pulse emitted during the capture cycle is the same for the first sub-frame pixel and the last sub-frame pixel, but the intensity and the duration of the active light pulse is different for at least one sub-frame pixel between the first sub-frame pixel and the last sub-frame pixel. In some embodiments, a duration of a capture is the same for the first sub-frame pixel and the last sub-frame pixel, but the duration of a capture is shorter for at least one sub-frame pixel between the first sub-frame pixel and the last sub-frame pixel.

In some embodiment, the array of detectors, the control circuitry and the processing system are integrated on a single chip. In some embodiments, the array of detectors and the control circuitry are integrated on a single chip and the processing system is external to the single chip.

In embodiments, the active light pulse in a given emitter/detector cycle for a given pixel comprises a number of pulses selected from the set consisting of a single pulse per pixel, a sequence of multiple pulses per pixel, a single pulse per sub-pixel, or multiple pulses per sub-pixel, and a frequency selected from the set consisting of a single frequency range or multiple frequency ranges.

In some embodiments, the array of detectors is configured to accumulate light based on a single accumulation for the timing relationship of the emitter/detector cycle that is unique for each sub-pixel.

In embodiments, an on-chip image processing system for 3D+ imaging utilizes sub-frame, composite image, and/or trapezoid analysis.

In embodiments, an on-chip image processing system for 3D+ imaging provides for two-axis motion determination for white point/black point composite imagery and three-axis motion determination for trapezoidal composite imagery, both motion determinations being based on a single, composite image instead of motion analysis done over multiple images.

In embodiments, an on-chip image processing system for 3D+ imaging increases the images-per-second processing rate with decreased power consumption.

In embodiments, an on-chip image processing system for 3D+ imaging generates a range gating depth map method whereby the depth calculation is independent of the reflectivity characteristic of the objects in the scene.

DETAILED DESCRIPTION OF THE EMBODIMENTS

Figure 1A:
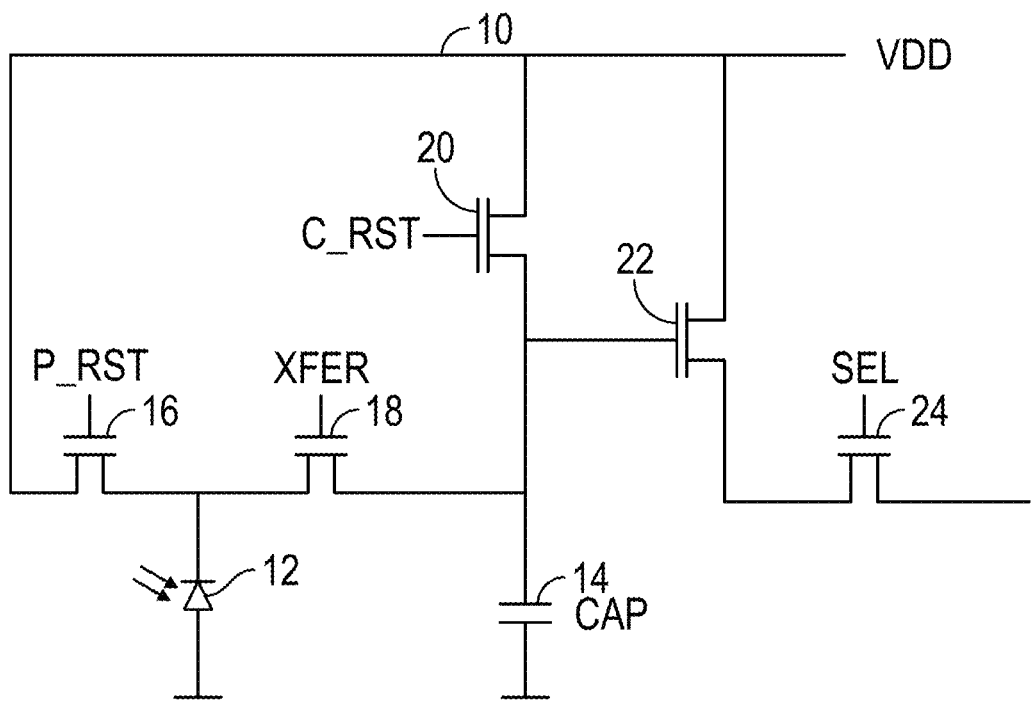
FIG. 1A illustrates an electrical circuit for a prior art single-frame imaging pixel for a five-transistor (5T) configuration.

FIG. 1 illustrates an electrical circuit 10 for a single-frame prior art imaging pixel for a five-transistor (5T) configuration. The seven components consist of a photodetector 12, a storage capacitor 14, a photodetector reset switch 16, a photodetector charge transfer switch 18, a capacitor reset switch 20, a non-destructive read transistor 22, and a selector switch 24. A photodetector 12 will convert optical energy to electrical energy and will store a charge at the photodetector when the photodetector reset switch 16 and the photodetector charge transfer switch 18 are both open. The amount of charge stored at the photodetector will depend on the number of incident photons during the integration period and the quantum efficiency of the photodetector material. At the end of an integration event, the charge collected at the photodetector 12 is transferred to the storage capacitor 14 by closing the transfer switch 18. Upon charge transfer, the integrated photodetector value is transferred from the pixel by closing the selector switch 24. The 5T pixel, as shown, supports multiple accumulations whereby multiple photodetector accumulation cycles are performed prior to closing the selector switch 24, the closing of which completes a sub-frame photodetector event. Imaging circuitry that supports multiple accumulation capability allows imaging systems to reduce noise, enables a higher signal-to-noise ratio (SNR), allows for shorter individual integration times when utilizing neighbor-in-time composite imaging and when utilizing range gating, and allows for increasing the amount of emitter light that is integrated during photodetector sub-frame cycles.

Figure 2:
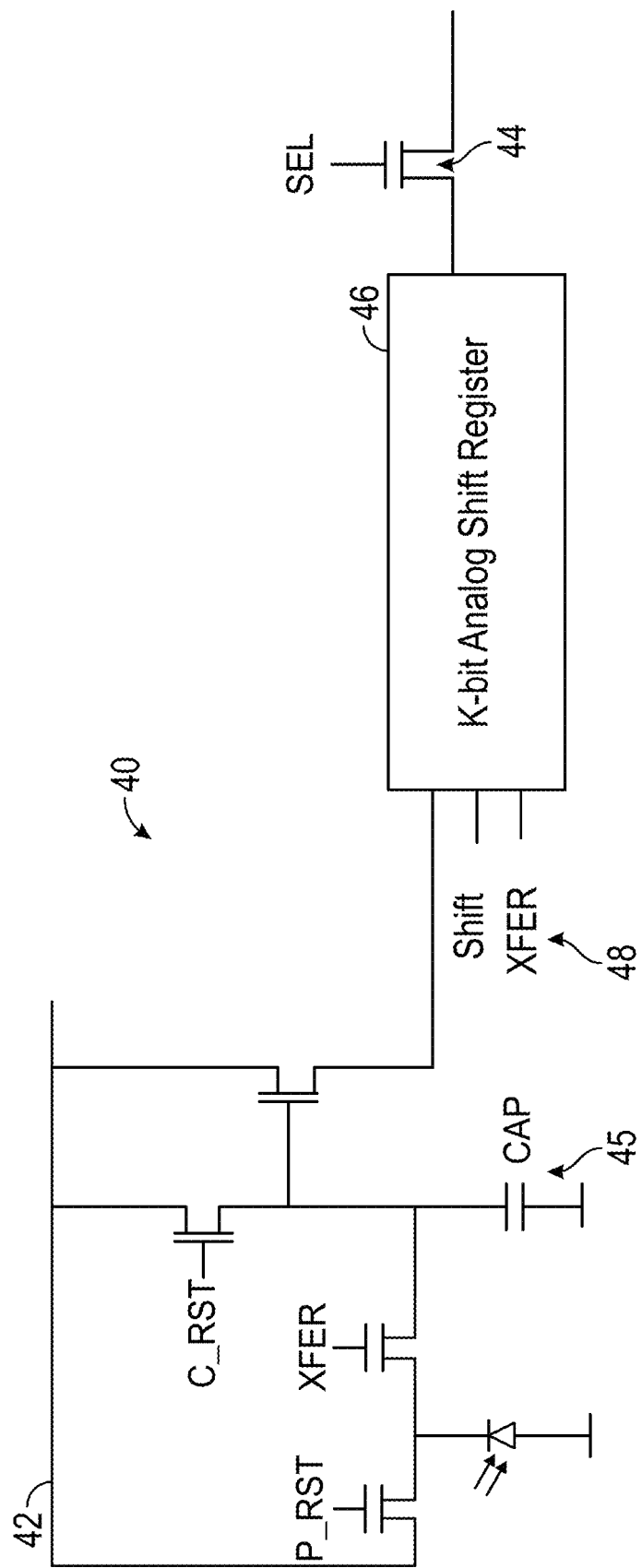
FIG. 2 illustrates an electrical circuit for a sub-frame imaging pixel in accordance with an embodiment utilizing a 5T architecture.

FIG. 2 illustrates an electrical circuit for a sub-frame imaging pixel 40 in accordance with an embodiment utilizing a 5T architecture. In embodiments, the sub-frame circuitry has three elements—a photodetector circuitry 42, analog shift register circuitry 46, and output circuitry 44. A value for one or more sub-frame integrations that is stored at the pixel capacitor 45 is provided to the input of an analog shift register 46. The analog value at the capacitor 45 is shifted to bit K−1 of the shift register 46 when the Shift 48 signal is activated. All analog values previously stored in the shift register 46 are shifted to the subsequent bit when Shift 48 is activated, and the pre-shifted value contained in bit 0 is lost. The select switch 44 enables bit 0 onto the pixel output bus. In embodiments, the number of bits in an analog shift register corresponds to the number of sub-frames for a composite image.

Figure 1B:
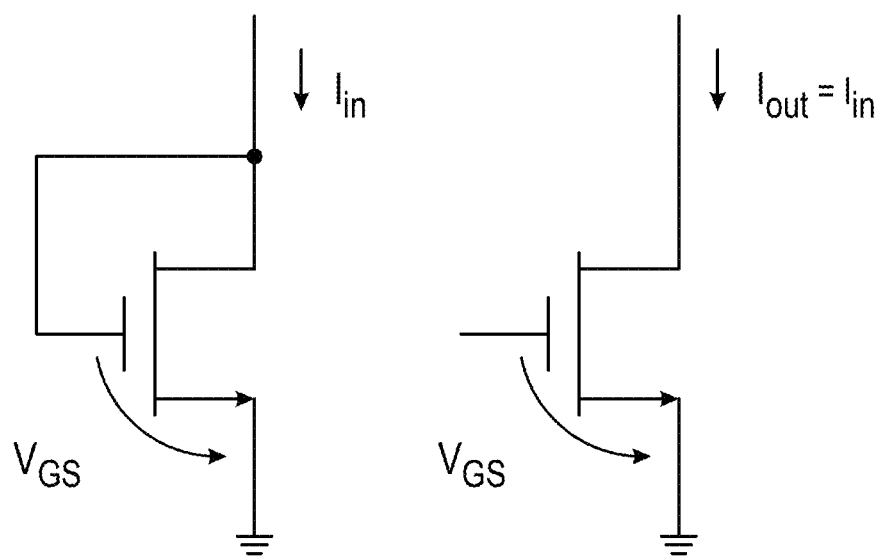
FIG. 1B illustrates a prior art switched-current memory.

As shown in FIG. 1B, a prior art switched-current memory (referred to herein as SI memory) is a memory that stores an analog value represented by a current in a capacitor and uses the $I_D$-$V_{GS}$ relation of a MOS transistor to do the conversion between current and voltage. With a diode-connected transistor collecting a current $I_{in}$, the transistor develops a gate-source voltage according to $I_{in}=\beta(V_{GS}-V_{TH})^2$. When the connection between gate and drain is broken, the charge in the gate has nowhere to go and remains constant. When the transistor is working as a current source, it produces the same current as it collected. The MOS transistor converts the current into voltage and stores it. Afterwards, it converts the gate voltage into the same current and supplies it.

Figure 3:
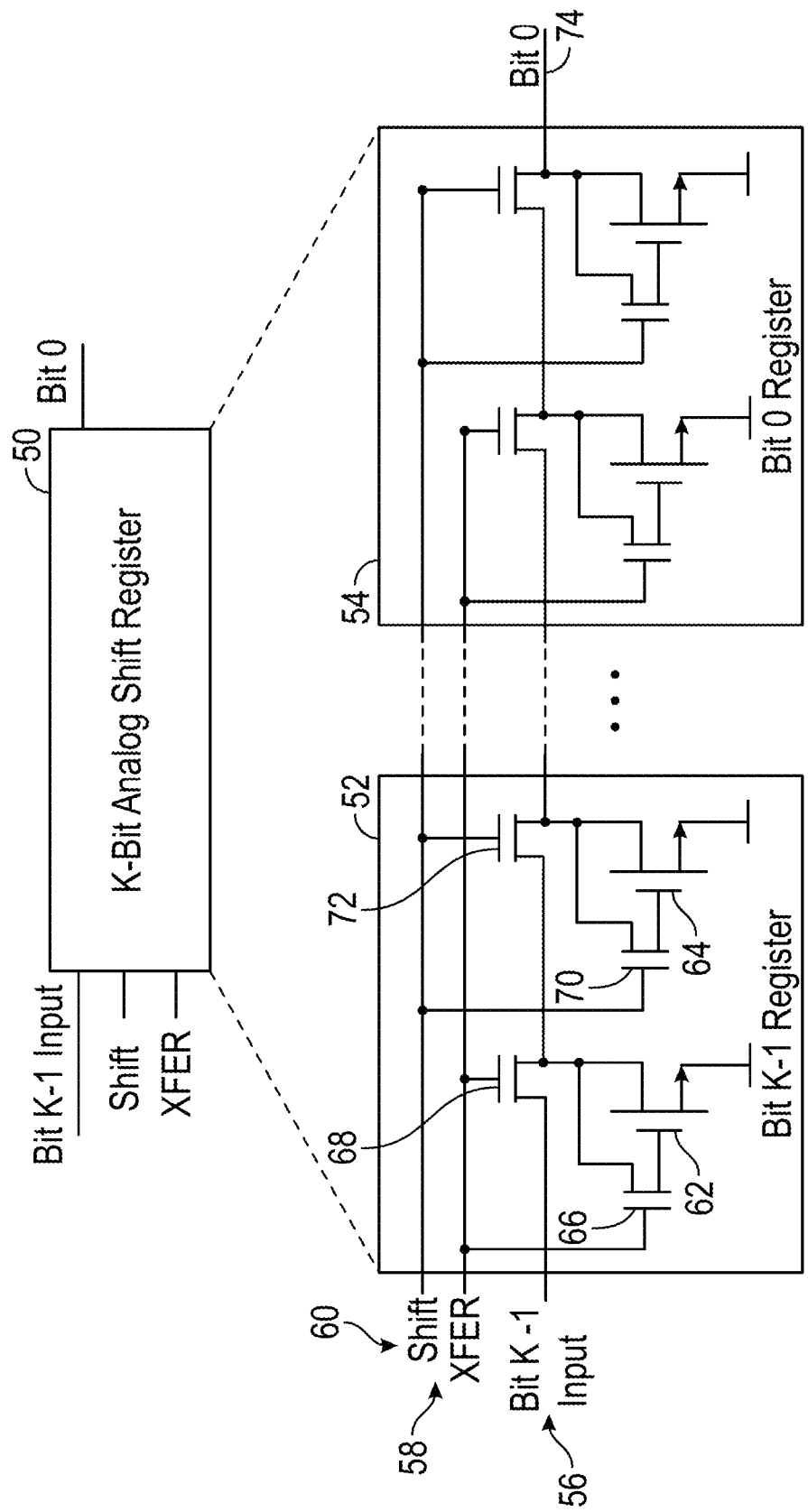
FIG. 3 illustrates a functional implementation of an embodiment for an analog shift register using SI memory.

SI memory has limitations for data accuracy and current draw. It is, however, an effective way to show functional current-switched logic. FIG. 3 illustrates a functional implementation of an embodiment for an analog shift register using SI memory. In embodiments, the shifting of an analog memory value from register k to k−1 involves two stages a transfer stage that receives the value from the previous register or input, and a shift stage that stores the value in the register output cell. A K-bit analog shift register 50 is shown as a functional symbol and in an expanded view, whereby the expanded view illustrates SI logic used for a bit K−1 register 52 and a bit 0 register 54. Intermediate bits of the K-bit analog shift register are represented by continuation dots, with signal and data interconnects represented with dashed lines. When the XFER 58 signal is active the transfer data switch 68 enables bit K−1 input 56 current to the source of the transfer storage transistor 62. When the XFER 58 signal is active the transfer storage switch 66 enables current flow to the gate of the transfer storage transistor 62. Upon deactivation of the XFER 58 signal, the original input data value is stored at the transfer storage transistor 62. When the Shift 60 signal is active the shift data switch 72 enables the data input current to the source of the shift storage transistor 64. When the Shift 60 signal is active the shift storage switch 70 enables current flow to the gate of the shift storage transistor 64. Upon deactivation of the Shift 60 signal, the transfer data value is stored at the shift storage transistor 64. For the bit 0 register 54, the source of the shift storage transistor provides the bit 0 output 74 of the K-bit analog shift register.

Figure 4:
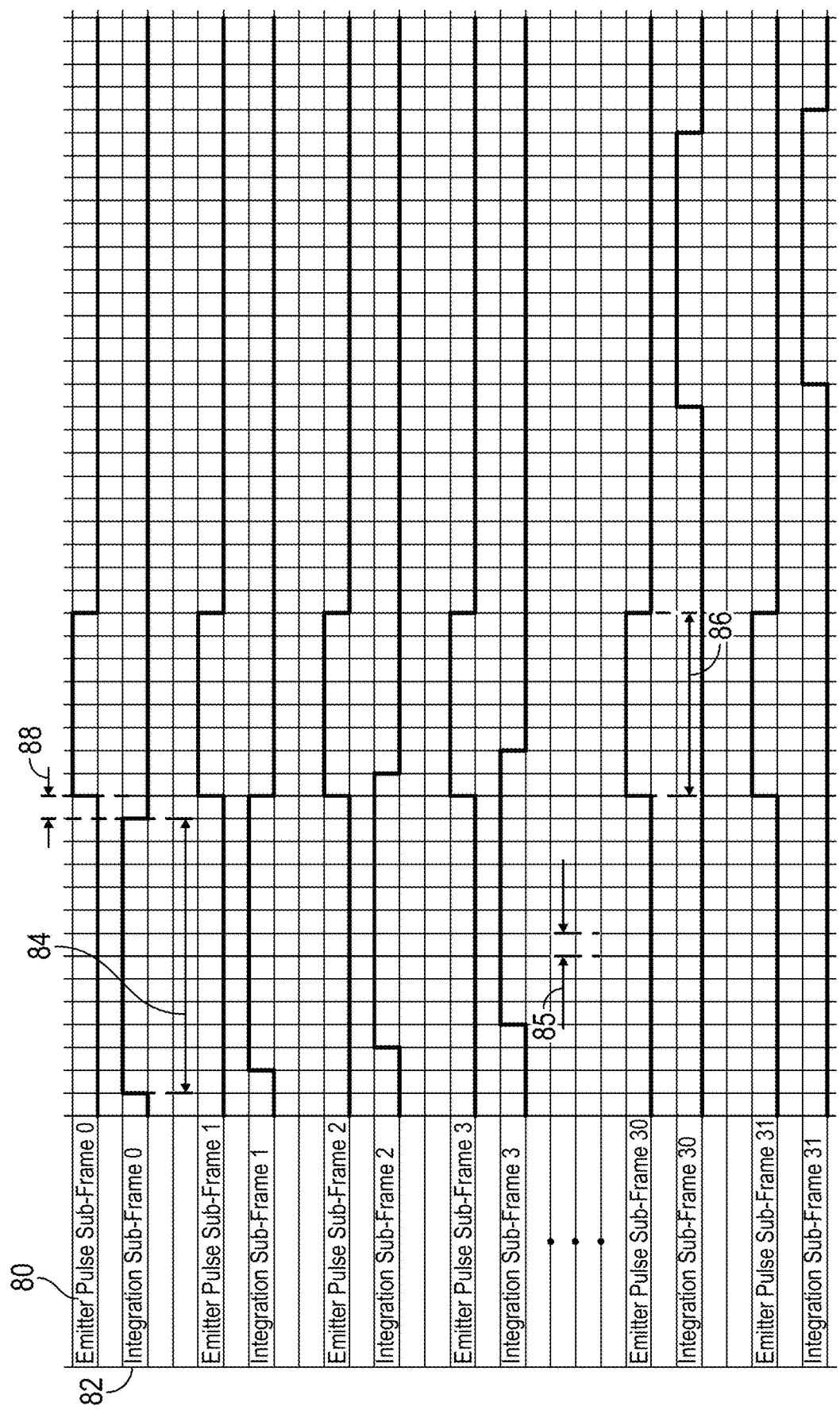
FIG. 4 illustrates emitter and detector timing for an embodiment with thirty-two sub-frames used to produce sub-frame composite images.

In embodiments, sub-frame capture and processing produces composite images. An example of composite imagery created with sub-frames is disclosed in U.S. Pat. No. 9,866,816 (Retterath) for an Active Pulsed 4D Camera, and this patent is incorporated by reference herein. FIG. 4 illustrates emitter and detector timing for thirty-two sub-frames used to produce sub-frame composite images. Although the sub-frame timing is shown on the same time scale, sub-frame 0 through sub-frame 31 capture occurs at disparate and consecutive times within a thirty-two sub-frame capture window. Emitter pulse sub-frame 0 80 is shown using an active high "on" signal and integration sub-frame 0 82 is shown using an active high "on" signal. In embodiments, there exists no time overlap between emitter pulse sub-frame 0 and integration sub-frame 0. The duration of the time difference between the end of integration sub-frame 0 82 and the start of emitter sub-frame 0 80 is denoted by the sub-frame 0 offset integration-end-to-emitter-start 88. In embodiments, the timing of integration and emitter signals is referenced relative to an emitter clock period duration 85. In embodiments, an emitter pulse duration 86 and an integration duration 84 are produced as multiple increments of an emitter clock period duration 85.

In accordance with various embodiments described herein sub-frame capture may utilize varying photodetector integration times for sub-frames within a passive composite image and will utilize varying timing relationships between emitter active and photodetector integration times. In some embodiments, the sub-frame processing techniques rely on the use of photodetector responses that are linearized. For active camera system embodiments, multiple emitter wavelengths may be utilized for the various modes. Multiple wavelengths may be emitted during a sub-frame cycle, or single wavelengths may be emitted during a single sub-frame cycle with a different wavelength being emitted during subsequent sub-frames within a composite imaging window. Not all operational modes of various embodiments utilize linearization; however, for operational modes that utilize photodetector linearization, photodetectors that respond to multiple wavelengths must have a linearization capability for every wavelength modality of the emitter(s). As an example, for a photodetector array that contains a Bayer filter, the individual photodetectors may have a green, blue or red filter associated with the photodetector and will have differing responses to visible light (400-700 nm) and to narrowband NIR light like 850 nm. Photodetectors with a red filter that are used in multispectral composite image sub-frame processing in accordance with this embodiment would require a linearization function for visible light and a linearization function for NIR light. Photodetectors with a green filter that are used in multispectral composite image sub-frame processing in accordance with this embodiment would require a linearization function for visible light and a linearization function for NIR light. Photodetectors with a blue filter that are used in multispectral composite image sub-frame processing in accordance with this embodiment would require a linearization function for visible light and a linearization function for NIR light.

Figure 5:
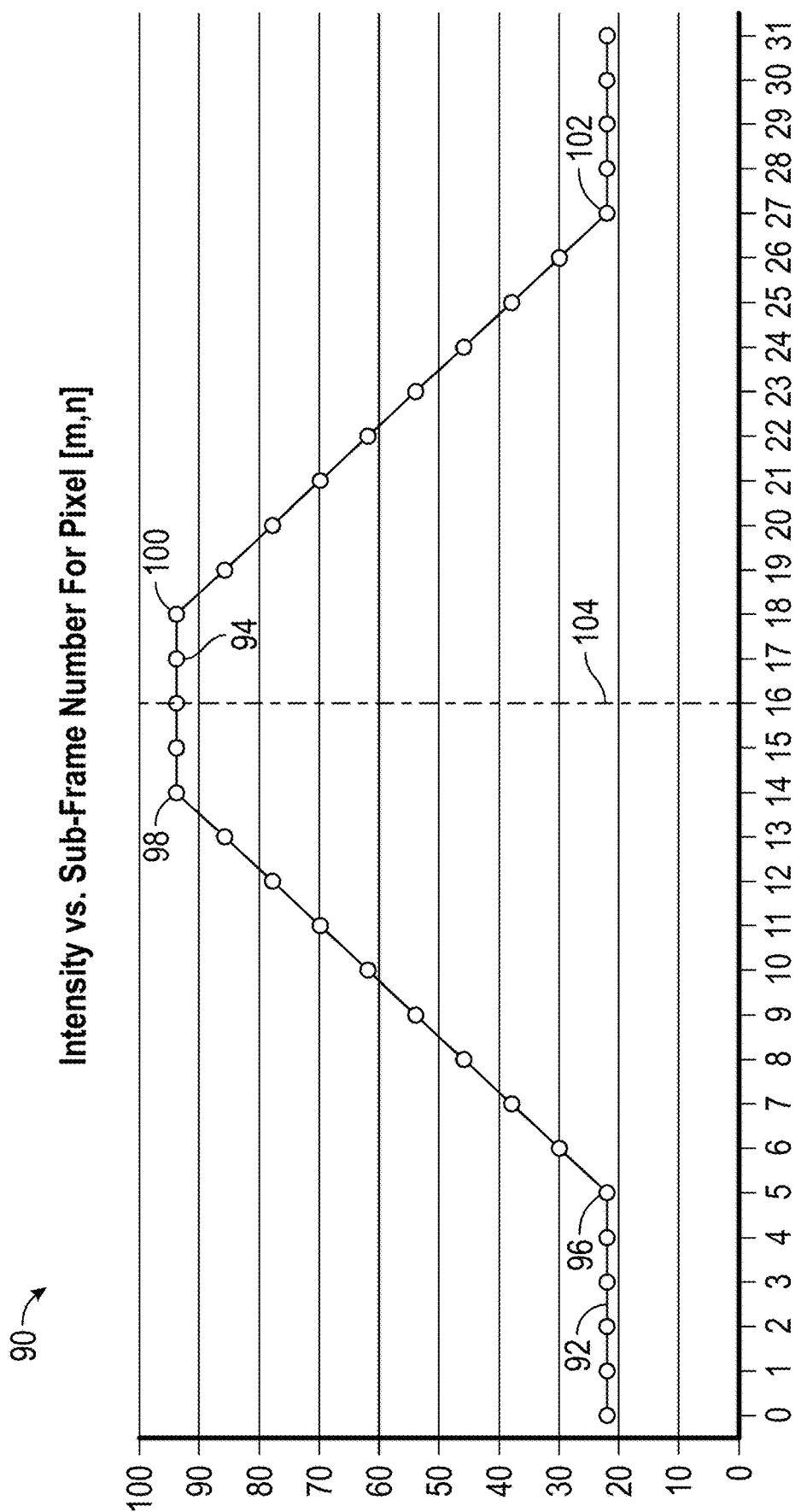
FIG. 5 illustrates a plot of intensity values vs. sub-frame number for the thirty-two-sub-frame imaging cycle shown in FIG. 4.

Sub-frame integration for a sub-frame composite imaging cycle will result in an intensity value for each pixel (m,n) in an imaging array. FIG. 5 illustrates a plot 90 of intensity values vs. sub-frame number for a thirty-two-sub-frame imaging cycle. In embodiments, based on the emitter and integration times for the sub-frames whereby there is no emitter-detector overlap at sub-frame 0 and there is no emitter-detector overlap at sub-frame 31, the resulting intensity waveform 90 is a trapezoid for all pixels that image objects within a camera's imaging range. Pixels outside the camera's range and imaging in attenuating environments will typically result in waveforms that contain partial trapezoidal elements. For an isosceles trapezoidal waveform 90, the value of the base of the trapezoid represents a black point 92 intensity and the value of the top of the trapezoid represents a white point 92 intensity. Four trapezoid inflection points 96, 98, 100, 102 are defined as the leading-edge-black-inflection-point 96 [IP0(i,sf)], the leading-edge-white-inflection-point 98 [IP1(i,sf)], trailing-edge-white-inflection-point 100 [IP2(i,sf)], and trailing-edge-black-inflection-point 102 [IP3(i,sf)]. The center of mass of the trapezoid based on white point inflection points is defined according to:

$$CoM_{WhitePoint}(sf)=(IP2(sf)-IP1(sf))/2 \qquad \text{Eq. 1}$$

Where IP2(sf) is the sub-frame value of IP2(i,sf)
IP1(sf) is the sub-frame value of IP1(i,sf)

Alternatively, the center of mass of the trapezoid based on black point inflection points is defined according to:

$$CoM_{BlackPoint}(sf)=(IP3(sf)-IP0(sf))/2 \qquad \text{Eq. 2}$$

Where IP3(sf) is the sub-frame value of IP3(i,sf)

IP0(sf) is the sub-frame value of IP0(i,sf)

For an isosceles trapezoidal, sub-frame composite image pixel waveform, Eqs. 1 and 2 yield equivalent results. In embodiments, sub-frame composite image timing is implemented with thirty-two sub-frames, an emitter clock period of 8 nanoseconds, an integration time of twelve emitter clock periods, an emitter pulse width of eight emitter clock periods, a sub-frame 0 offset from detector end to emitter start of one emitter clock period, and a sub-frame period duration of 5 μSec. Based on these parameters, the shape, size, and horizontal location of isosceles trapezoidal waveforms is defined sufficiently to allow a trapezoidal descriptor to enable the computation of a distance parameter for every pixel in an array. A sub-frame trapezoid descriptor for a 32/8/8/12/1/5 configuration is shown:

Sub-frame trapezoidal descriptor parameters:

| Sub-frame trapezoidal descriptor parameters: | |
|---|---|
| # of sub-frames | 32 |
| Emitter clock period | 8 nSec |
| Emitter pulse width | 8 emitter clock periods |
| Integration width | 12 emitter clock periods |
| Sub-frame 0 integration end to emitter start | 1 emitter clock period |
| Sub-frame period duration | 5 μSec |
| Speed of light constant (in a vacuum) | 0.299792 m/nSec |
| Sub-frame trapezoidal descriptor derived values: | |
| Trapezoid IP0(sf) at d = 0 | 1 |
| Trapezoid IP1(sf) at d = 0 | 9 |
| Trapezoid IP2(sf) at d = 0 | 13 |
| Trapezoid IP3(sf) at d = 0 | 21 |
| Trapezoid CoM(sf) at d = 0 | 11 |
| Trapezoid lower base width | 20 |
| Trapezoid upper base width | 4 |
| Trapezoid width at mid-height | 12 |
| Range of camera | 24.0 meters |

Trapezoidal descriptor parameters are used to identify other trapezoid parameters and are used to identify inflection point "locations" and a CoM "location" at a distance of d=0, where location refers to the sub-frame number at which the point intersects the horizontal axis of an isosceles trapezoid pixel plot. In embodiments, sub-frame locations for points are specified in floating point values, thus yielding higher accuracy for pixel distance determinations. According to the trapezoidal descriptor derived values, the four inflection points at d=0 are at sub-frames 1, 9, 13, and 21 for the four inflection points IP0(sf), IP1(sf), IP2(sf), IP3(sf), respectively. The trapezoid CoM(sf) at d=0 is at sub-frame 11 and is computed by using Eq. 1 or Eq. 2. For composite image post-processing, the distance for each pixel is determined by computing the delta between the CoM(sf) value for pixel (m,n) and the CoM(sf) for d=0, where:

$$\Delta CoM_{[m,n]} = CoM_{(m,n)}(sf) - CoM_{d=0}(sf) \qquad \text{Eq. 3}$$

Where $CoM_{(m,n)}(sf)$ is the CoM of a trapezoid for pixel [m,n]

$CoM_{d=0}(sf)$ is the CoM at d=0 from the trapezoid descriptor

The distance for pixel (m,n), where distance is defined as the measure from the camera to the object represented by pixel (m,n), is computed according to:

$$\text{Distance}_{[m,n]} = (\Delta CoM_{(m,n)} * C * P_{emitter})/2 \qquad \text{Eq. 4}$$

Where C is a constant for the speed of light in a medium $P_{emitter}$ is the emitter clock period In embodiments, the range of a sub-frame composite imaging camera may be specified in various ways, depending on the shape and structure of the resulting waveform. For isosceles trapezoidal waveforms, the range is defined as the maximum pixel distance for which an isosceles trapezoidal waveform lies completely within the sub-frame range for a trapezoidal descriptor. Said another way, the maximum range of a distance-measuring camera that utilizes sub-frame collection and isosceles trapezoidal waveform processing is defined as the point at which IP3(sf) is equal to the maximum sub-frame number. In embodiments, the center of mass for a maximum range isosceles trapezoid is computed according to:

$$CoM_{MaxRange} = SF_{max} - (Width_{LowerBase}/2) \qquad \text{Eq. 5}$$

Where $SF_{max}$ is the maximum sub-frame number $Width_{LowerBase}$ is the width of the lower trapezoid base In embodiments, the maximum device range for distance measurements is computed according to:

$$\text{Range}_{max} = \{[SF_{max} - (Width_{LowerBase}/2) - CoM_{d=0}(sf)] * C * P_{emitter}\}/2 \qquad \text{Eq. 6}$$

Where $SF_{max}$ is the maximum sub-frame number $Width_{LowerBase}$ is the width of the lower trapezoid base $CoM_{d=0}(sf)$ is the sub-frame for the CoM at which d=0

Figure 6:
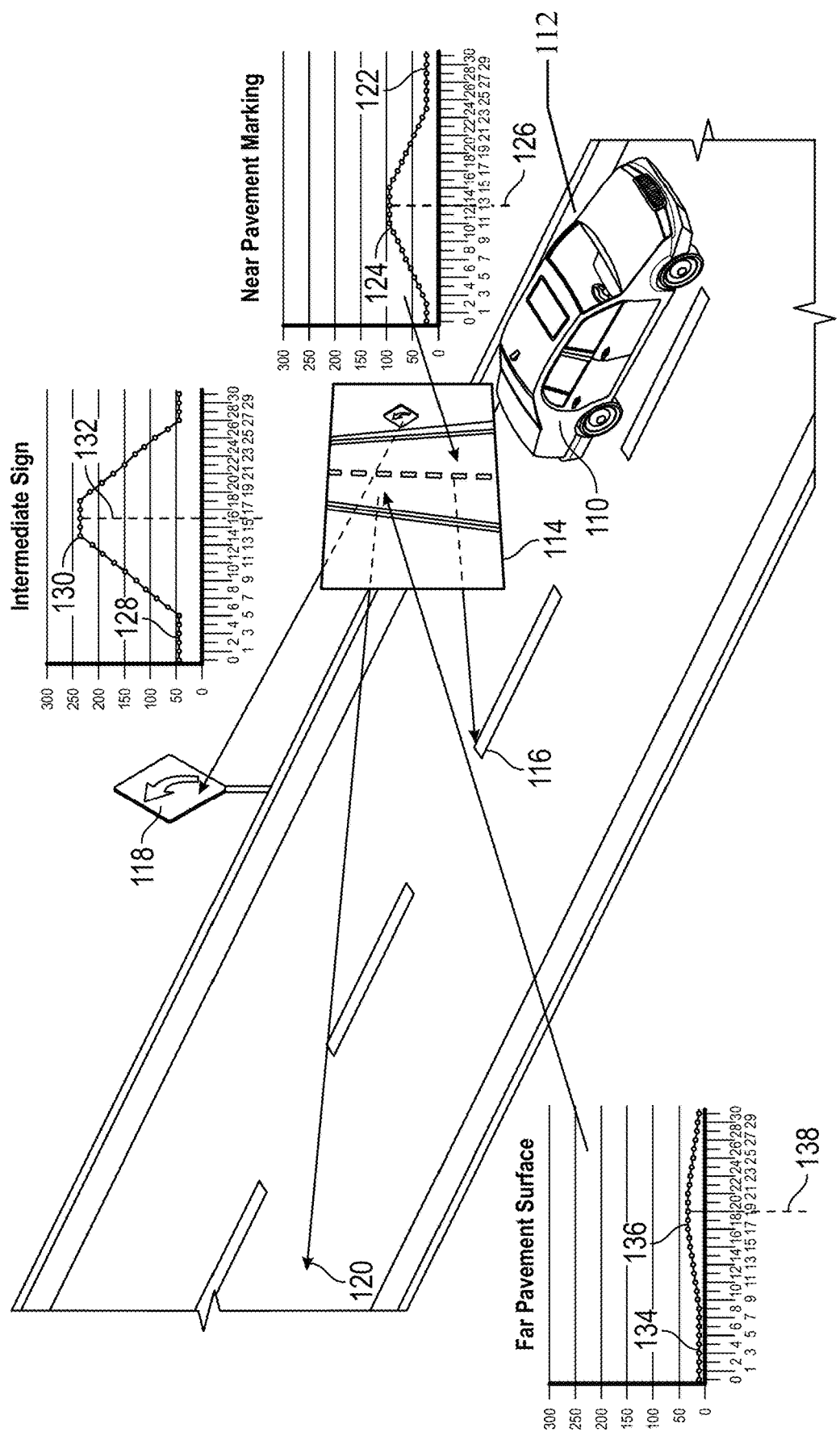
FIG. 6 illustrates a vehicle traversing a roadway with a sub-frame-processing, composite-imaging camera in accordance with an embodiment.

C is a constant for the speed of light in a medium $P_{emitter}$ is the emitter clock period FIG. 6 illustrates a vehicle 110 traversing a roadway with the vehicle 110 including a sub-frame-processing-composite-imaging camera 112. A field-of-view (FOV) 114 of an unprocessed collection of sub-frames of the camera 112 is illustrated whereby sub-frames include collected information for a near pavement marking 116, an intermediate-distance road sign 118, and a farther-distance roadway point 120. The near pavement marking intensity plot indicates a black point intensity 122, a white point intensity 124, and a CoM 126. The intermediate sign intensity plot indicates a black point intensity 128, a white point intensity 130, and a CoM 132. The far pavement surface intensity plot indicates a black point intensity 134, a white point intensity 136, and a CoM 138. The FOV 114 description indicates that sub-frame collection for all objects within a camera's range occurs within a multiple-sub-frame composite imaging window.

Figure 7:
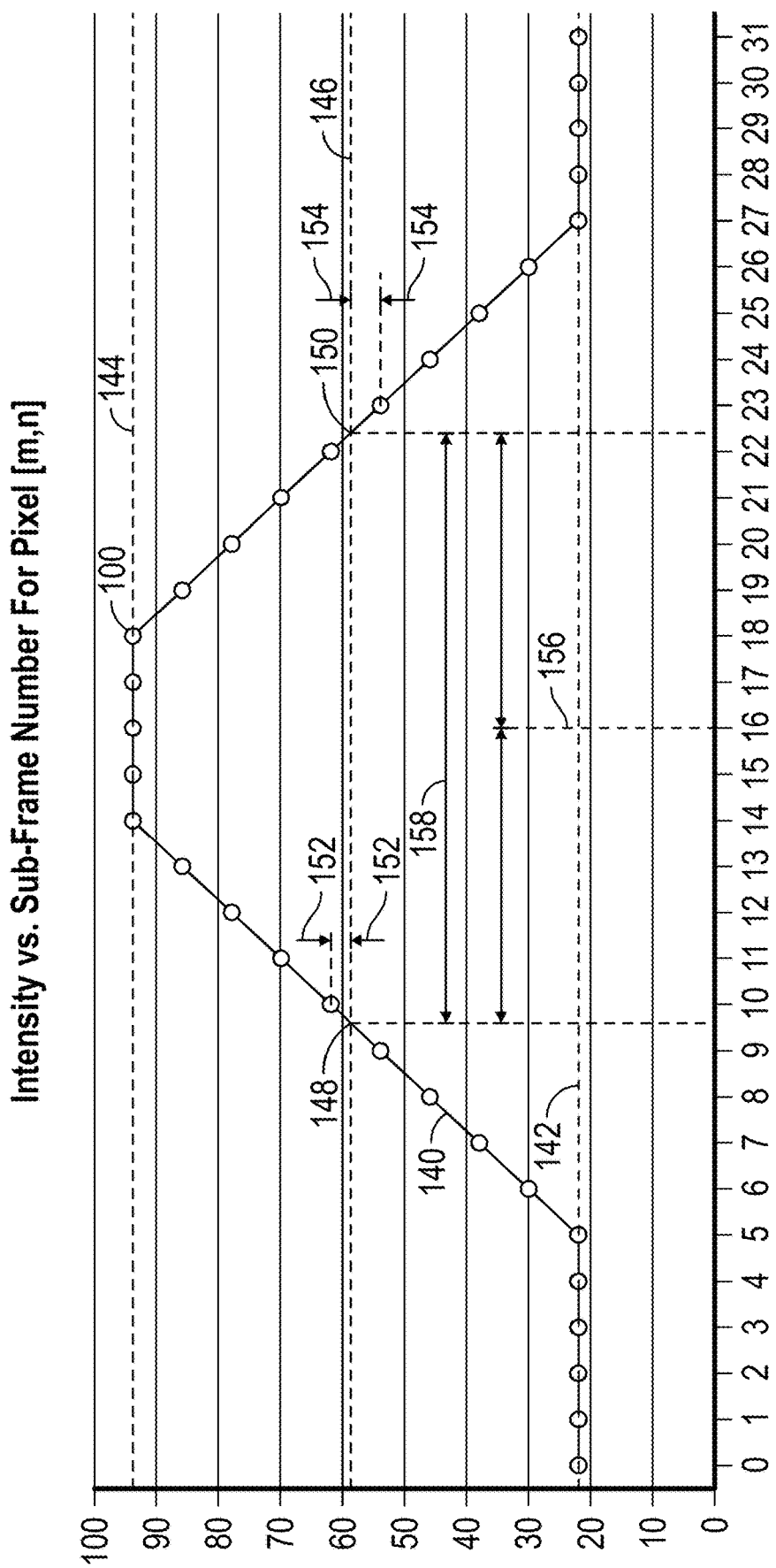
FIG. 7 illustrates a waveform produced with timing parameters according to an embodiment with a trapezoid descriptor for a 32/8/8/12/1/5 configuration

The use of inflection points for center of mass calculations for isosceles trapezoids leads to decreased precision for distance calculations when inflection points do not correspond to integer values of sub-frame numbers. In embodiments, this limitation is removed by utilizing waveform mid-height crossover points to determine center of mass. FIG. 7 illustrates a waveform 140 produced with timing parameters according to a trapezoid descriptor for a 32/8/8/12/1/5 configuration. A black point intensity level 142 is determined from the minimum intensity for the K sub-frame intensity values, and a white point intensity level 144 is determined from the maximum intensity for the K sub-frame intensity values. In embodiments, a mid-height intensity 146 value is the average of the black point and white point value and is defined according to:

$$I_{mid-ht}(m,n) = (I_{BlackPoint}(m,n) + I_{WhitePoint}(m,n))/2 \qquad \text{Eq. 7}$$

The slope of the leading edge of the waveform is computed according to:

$$\text{Slope}_{LeadingEdge} = (I_{BlackPoint}(m,n) - I_{WhitePoint}(m,n))/(IP1(sf) - IP0(sf)) \quad \text{Eq. 8}$$

The slope of the trailing edge of the waveform is computed according to:

$$\text{Slope}_{TrailingEdge} = (I_{BlackPoint}(m,n) - I_{WhitePoint}(m,m))/(IP3(sf) - IP2(sf)) \quad \text{Eq. 9}$$

In embodiments, an algorithm for determining the mid-height crossover points 148, 150 for the leading edge 148 and trailing edge 150 consists of a process of incrementing sub-frame numbers and identifying the sub-frame number at which the leading and trailing edge waveforms cross over the computed mid-height intensity 146 value. The leading-edge remainder 152 is the intensity value difference between the leading edge sub-frame crossover point intensity value and the mid-height intensity 146 value. The sub-frame value at which the leading edge crosses over the mid-height intensity is computed according to Eq. 10 below:

$$SF_{mid\text{-}ht\text{-}lead}(m,n) = SF_{mid\text{-}ht\text{-}exc\text{-}lead}(m,n) - [(I_{mid\text{-}ht\text{-}exc\text{-}lead}(m,n) - I_{mid\text{-}ht}(m,n))/\text{Slope}_{LeadingEdge}]$$

Where $SF_{mid\text{-}ht\text{-}exc\text{-}lead}(m,n)$ is the leading-edge sub-frame at which the intensity exceeds the mid-height value for pixel (m,n)

$I_{mid\text{-}ht\text{-}exc\text{-}lead}(m,n)$ is the intensity value for the leading-edge sub-frame at which the intensity exceeds the mid-height value for pixel (m,n) $\text{Slope}_{LeadingEdge}$ is the slope of the leading edge of the trapezoid The trailing-edge remainder 154 is the intensity value difference between the trailing edge sub-frame crossover point intensity value and the mid-height intensity 146 value.

The sub-frame value at which the trailing edge crosses over the mid-height intensity is computed according to Eq. 11 below:

$$SF_{mid\text{-}ht\text{-}trail}(m,n) = SF_{mid\text{-}ht\text{-}exc\text{-}trail}(m,n) - [(i_{mid\text{-}ht\text{-}exc\text{-}trail}(m,n) - I_{mid\text{-}ht}(m,n))/\text{Slope}_{TrailingEdge}]$$

Where $SF_{mid\text{-}ht\text{-}exc\text{-}trail}(m,n)$ is the trailing-edge sub-frame at which the intensity exceeds the mid-height value for pixel (m,n)

$i_{mid\text{-}ht\text{-}exc\text{-}trail}(m,n)$ is the intensity value for the trailing-edge sub-frame at which the intensity exceeds the mid-height value for pixel (m,n) $\text{Slope}_{TrailingEdge}$ is the slope of the trailing edge of the trapezoid The CoM 156 of the waveform 140 is the mid-point of the leading-edge crossover point 148 and the trailing-edge crossover point 150 and is computed according to:

$$CoM(m,n) = (SF_{mid\text{-}ht\text{-}lead}(m,n) + SF_{mid\text{-}ht\text{-}trail}(m,n))/2 \quad \text{Eq. 12}$$

The computed trapezoid mid-height width 158 is the offset (in sub-frames) between of the leading-edge crossover point 148 and the trailing-edge crossover point 150 and is computed according to:

$$\text{Width}_{MidHeight}(m,n) = sf_{mid\text{-}ht\text{-}trail}(m,n) - sf_{mid\text{-}ht\text{-}lead}(m,n) \quad \text{Eq. 13}$$

For an isosceles trapezoid, the computed value of the mid-height width 158 will be equivalent to the mid-height width from the trapezoidal descriptor. Variations between the computed mid-height width 158 and the corresponding trapezoidal descriptor value are indications of scenarios like imaging in attenuating environments or motion of objects in a scene and/or motion of a camera.

In embodiments, an algorithm is specified for execution on a one or more CPUs or GPUs for determining black point, white point and CoM for each pixel (m,n) in a sub-frame, composite imaging system and is as follows:

| CPU/GPU Pseudocode | | |
|---|---|---|
| Constants: | | |
| | SF = number of sub-frames per composite image | |
| | M = number of columns of pixels in FPA | |
| | N = number of rows of pixels in FPA | |
| | CPU/GPU instruction | CPU/GPU Comment |
| Begin | m = 0 | initialize column counter |
| | n = 0 | initialize row counter |
| LoopMN | k = 0 | initialize loop count for BP, WP |
| | BlackPoint[m,n] = 0x3FF | initialize BP to a high value |
| | WhitePoint[n,m] = 0 | initialize WP to a low value |
| LoopWP | Read i[m,n,k] | read bit k from shift memory |
| | If i[m,n,k] < BlackPoint[m,n] | bit k lowest so far? |
| |    BlackPoint[m,n] = i[m,n,k] | if yes, make bit sf new lowest |
| | endif | |
| | If i[m,n,k] > WhitePoint[m,n] | bit k highest so far? |
| |    WhitePoint[m,n] = i[m,n,k] | if yes, make bit k new highest |
| | endif | |
| | k = k+1 | increment sub-frame counter |
| | If k<K, GoTo LoopWP | end of |
| | MidHeight[m,n] = WhitePoint[m,n] − BlackPoint[m,n] | mid-height intensity value |
| | LeadEdgeMidPassed[m,n] = FALSE | initialize leading edge CoM flag |
| | k = 0 | initialize loop count for CoM |
| | TrailEdgeActive[m,n] = FALSE | initialize search for trailing edge |
| | LastI[m,n] = BlackPoint[m,n] | initialize intensity value for k−1 |
| LoopLead | If LeadEdgeMidPassed[m,n] = FALSE, Do | |
| |   If i[m,n,k] > MidHeight[m,n] | Leading edge crossed midpoint? |
| |     LeadEdgeMidPassed[m,n] = TRUE | |
| |     LeadingCrossover[m,n] = k + {(MidHeight[m,n] − LastI[m,n])/(i[m,n,k] − LastI[m,n])} | |
| |     TrailEdgeActive[m,n] = TRUE | |
| |   endif | |
| | endif | |
| | If TrailEdgeActive[m,n] = TRUE, Do | |
| |   If i[m,n,k] < MidHeight[m,n] | Trailing edge crossed midpoint? |

CPU/GPU Pseudocode

```
            TrailingCrossover[m,n] = k + {(MidHeight[m,n] -
            LastI[m,n])/(i[m,n,k] - LastI[m,n])}
            TrailEdgeActive[m,n] = FALSE
        endif
    endif
    k = k+1                              increment sub-frame counter
    If k<K, GoTo LoopLead                end of
    CoM[m,n] = TrailingCrossover[m,n] - LeadingCrossover[m,n]
    m = m + 1                            increment column counter
    If m ≠ M, GoTo LoopMN                end of column?
    endif
    m=0                                  if yes, reset column counter
    n = n + 1                            and increment row counter
    If n ≠ N, GoTo LoopMN                end of row?
    endif                                if yes, CoM algorothm complete
```

Figure 8:
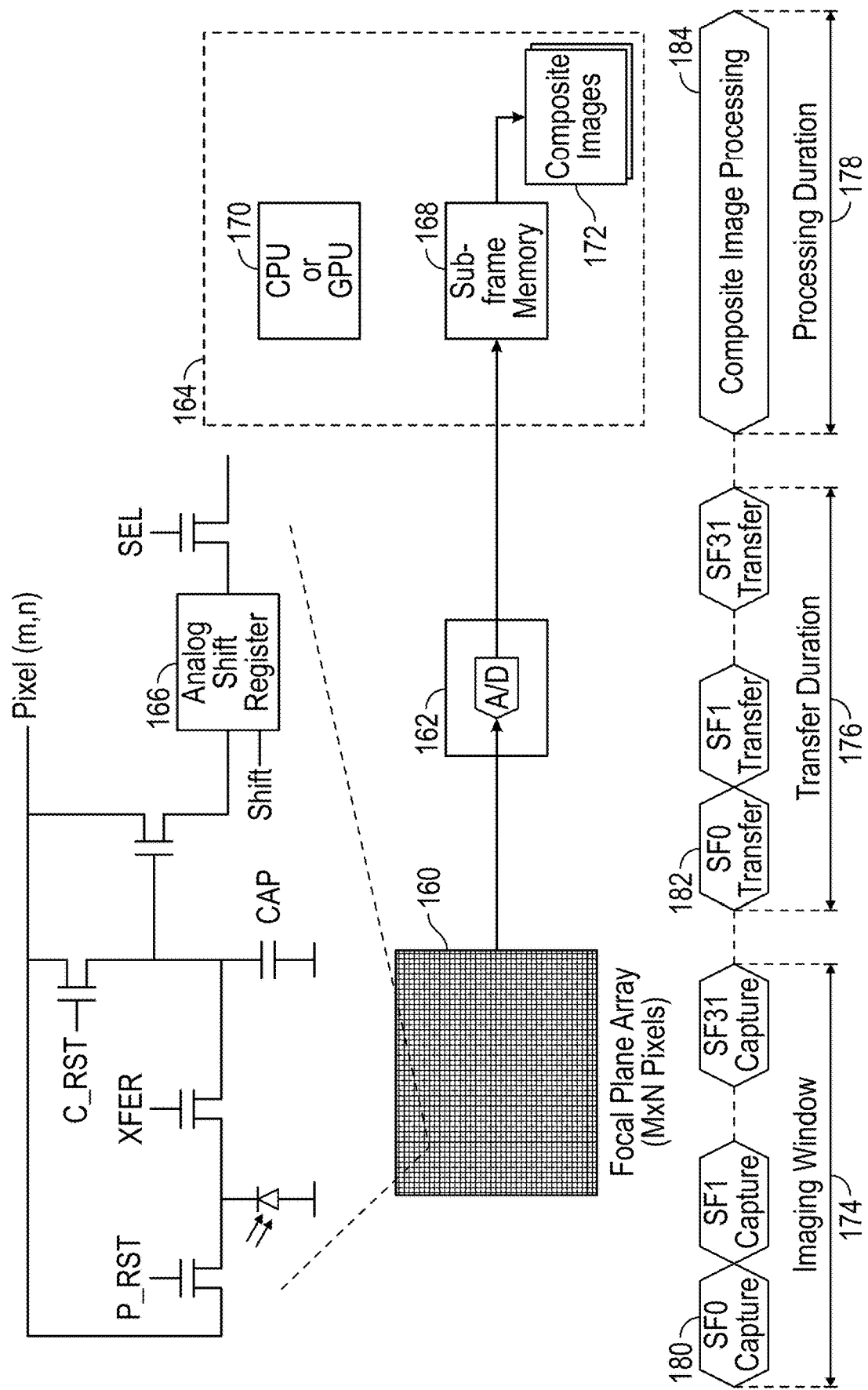
FIG. 8 illustrates components of an embodiment of a sub-frame-processing, composite imaging system.

FIG. 8 illustrates components of an embodiment of a sub-frame-processing, composite imaging system. There are three sequential stages of the system—an analog focal plane array 160, an off-device transfer 162 and A/D conversion, and a digital sub-frame processor 164. In embodiments, pixels 166 within a focal plane array 160 include a K-bit shift register or other analog logic for storing information for K sub-frames. In embodiments, transfer 162 of information off an imaging device like a focal plane array 160, the transfer 162 of which includes A/D conversion, is specified according to a transfer rate in the form of, typically, multiple gigabytes per second. In embodiments, digital sub-frame processing 164 will include memory 168 to store the digital information for the K sub-frames, will include one or more processing elements like CPUs or GPUs 170, and will include digital storage for the one or more composite images 172 that result from the sub-frame processing.

The overall throughput and composite image rate for a device is determined by the durations of the three stages 162, 162, 164. In embodiments, a duration for an imaging window establishes the time it takes for all K sub-frames to be integrated and shifted into analog shift registers located at each pixel 166. In embodiments, considerations for an imaging window duration 174 are determined by the amount of motion expected in a scene, the amount of motion expected for a composite camera, and the desired maximum horizontal and vertical pixel movement for sub-frame zero through sub-frame K−1. In embodiments, an imaging window duration for optimal performance for forward-facing and rear-facing camera automotive applications is in the range from 50 μSec to 200 μSec. In embodiments, side-facing or oblique-angle automotive applications provide optimal performance with imaging windows durations in the range from 25 μSec to 150 μSec. In embodiments, smart phone and industrial camera applications provide optimal performance with imaging windows durations in the range from 50 μSec to 2000 μSec. Transfer duration 176 specifies the time it takes to transfer 162 all sub-frames off an imaging device. Sub-frame transfer duration is determined by the focal plane array 160 bus transfer 162 rate and is defined according to:

$$\text{TransferDuration} = (AD \times M \times N \times K)/(R_{Transfer} \times 2^{30} \times 8) \quad \text{Eq. 14}$$

Where AD is the number of bits utilized in A/D conversion
M is the number of columns in a focal plane array
N is the number of rows in a focal plane array
K is the number of sub-frames per composite image
$R_{Transfer}$ is the specified transfer rate of a bus in GB/sec
$2^{30}$ represents the number of bytes in a gigabyte
8 represents the number of bits in a byte As an example, the transfer duration 176 for a 16 mega-pixel composite imaging system with K=32 sub-frames per composite image is computed according to these parameters:

| | |
|---|---|
| Focal Plane Array size | 16,777,216 pixels |
| Bits per pixel for A/D Conversion | 12 bits/pixel |
| Bytes per pixel | 1.5 Bytes/pixel |
| Focal Plane Array bus transfer rate | 5 GB/sec |
| Number of sub-frames per composite image | 32 sub-frames |

The resulting transfer duration according to Eq. 14 is 150 milliseconds (mSec).

In embodiments, upon transfer of information to sub-frame memory 168, the CPU/GPU 170 performs sub-frame processing at the pixel level to determine black point, white point, and CoM for each pixel. In embodiments, utilizing multiple GPUs for processing will typically lead to a lower elapsed time for pixel processing. In embodiments, sub-frame pixel processing time for each pixel, expressed in microseconds, is computed according to:

$$t(m,n)_{Sub\text{-}framePixelProcessing} = \text{OpNum}/\text{MFLOP} \quad \text{Eq. 15}$$

Where OpNum is the number of operations per pixel to perform an algorithm
MFLOP stands for Mega-FLOPs and is the number of millions of floating point operations per second for a single GPU In embodiments, for a CoM algorithm with OpNum equal to 500 operations running on a 50 MFLOP processor, Eq. 15 results in an elapsed time for processing of a single pixel of 10 microseconds. In embodiments, for a camera system with M×N pixels and a frame processor that includes multiple CPU/GPU cores, the processing duration is computed according to:

$$\text{ProcessingDuration} = (t(m,n)_{Sub\text{-}framePixelprocessing} \times M \times N)/\text{NumPU} \quad \text{Eq. 16}$$

Where M is the number of columns in a focal plane array
N is the number of rows in a focal plane array
NumPU is the number of processing units used for algorithmic computation In embodiments, for a camera system with M equal to 4096 pixels, N equal to 4096 pixels, and a frame processor that includes 1024 CPU/GPU cores with each core running at 50 MFLOPs, the resulting processing duration is 163.84 milliseconds. Having computed the durations for the stages of composite image collection, transfer, and processing, the overall elapsed time of the stages is:

| Imaging Window | 0.16 milliseconds |
|---|---|
| Transfer Duration | 150 milliseconds |
| Processing Duration | 163.84 milliseconds |
| Total Elapsed Time | 314.00 milliseconds |

The elapsed time of 314.00 milliseconds results in an overall performance specification for a 32 sub-frame processing, composite image-generating 3D+ camera of approximately 3.2 composite images per second. For applications that require performance of 30 or 60 images per second, 3.2 images per second comes well short of meeting the requirements. In embodiments, camera architecture may be modified for pipelined processing whereby sequential stages in a process are overlapped in time by utilizing extra storage and/or additional electronics, typically at the expense of higher components costs and higher electrical current requirements. In embodiments, total elapsed time for pipelined operation may be reduced to 163.84 milliseconds, which is the elapsed time for the stage with the longest elapsed time. The elapsed time of 163.84 milliseconds results in an overall performance specification for a 32 sub-frame processing, composite image-generating 3D+ camera of approximately 6.1 composite images per second, which is still well short of a desired throughput rate for many imaging applications.

According to Wong (https://www.imperial.ac.uk/media/imperial-college/faculty-of-engineering/computing/public/1718-pg-projects/WongM-Analog-Vision.pdf), Focal-Plane Sensor-Processor (FPSP) chips are a special class of imaging devices in which the sensor arrays and processor arrays are embedded together on the same silicon chip (Zarandy, 2011). Unlike traditional vision systems, in which sensor arrays send collected data to a separate processor for processing, FPSPs allow data to be processed in place on the imaging device itself. This unique architecture enables ultra-fast image processing even on small, low-power devices, because costly transfers of large amounts of data are no longer necessary.

Figure 9:
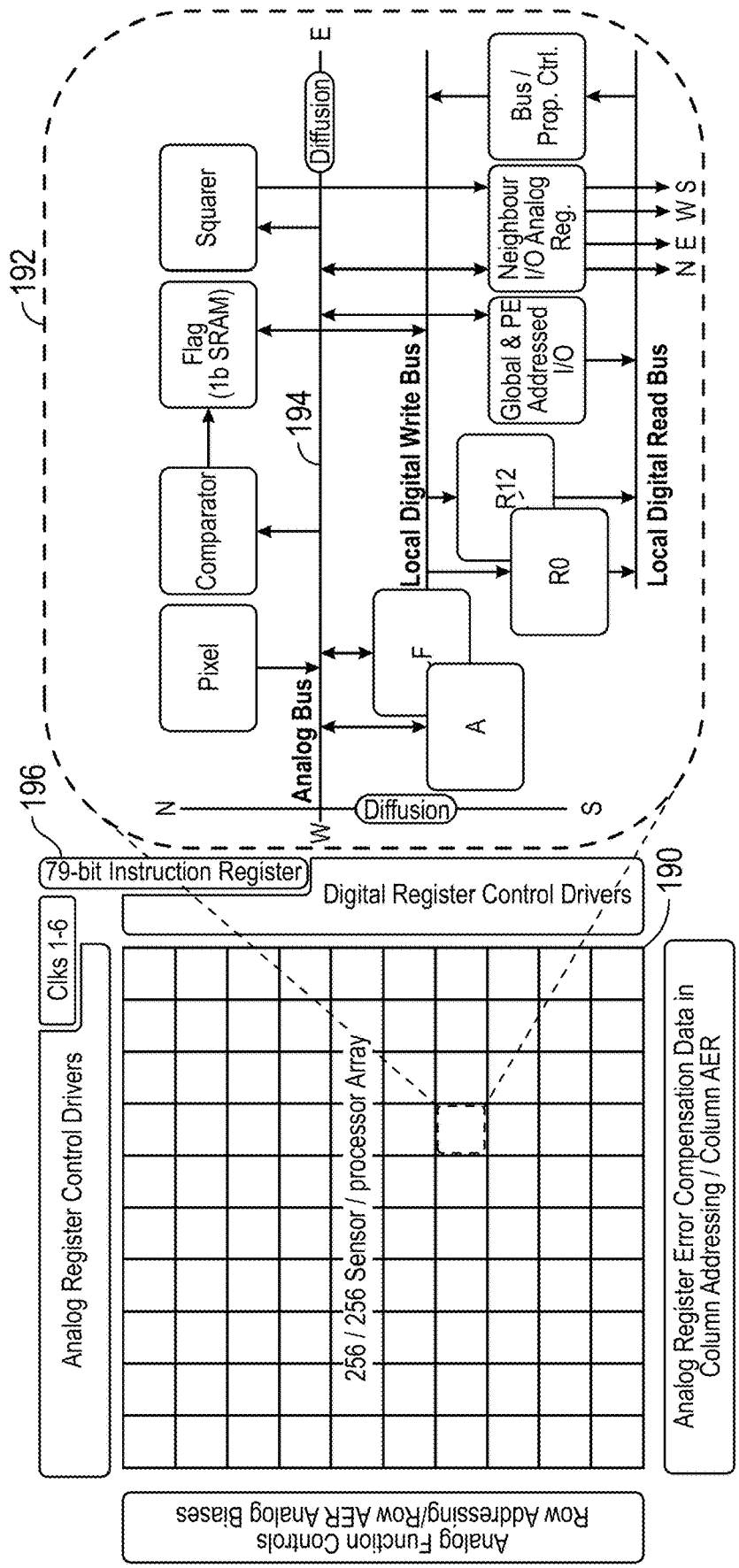
FIG. 9 illustrates a block diagram of a prior art SCAMP-5 FSPS.

According to Wong, the SCAMP-5 Vision Chip is a Focal-Plane Sensor-Processor (FPSP) developed at the University of Manchester (Carey et al., 2013a). FIG. 9 illustrates a block diagram of a prior art SCAMP-5 FSPS, which comprises 65,536 Processing Elements 192 (PEs) integrated in a 256×256 imager array 190. Each individual PE 192 includes a photodetector (pixel) and a processor (ALU, registers, control, and I/O circuits). Processor instructions are common across the device, with each individual PE 192 executing the common instructions on their own local data. Each PE 192 also has an activity flag, which can be set as required, allowing for some degree of local autonomy by specifying instructions to be carried out only by selected Pes 192. These flags can therefore be used to implement conditional operations when necessary. Instructions are received from a microcontroller attached to the chip, which sends a sequence of 79-bit instruction 196 words determining the algorithm to be executed. Instructions 196 are executed simultaneously across the PE 192 array, allowing instructions 196 to be rapidly completed in parallel. Each PE 192 comprises 6 analog registers (A-F) and 13 digital registers (R0-R12). A key distinguishing feature of the SCAMP-5 is that, unlike almost all mainstream processors today, arithmetic operations are carried out by the analog registers. These operations, including summation, subtraction, division, and squaring, are implemented using analog current-mode circuits connected to an analog bus 194 and are able to operate directly on the analog pixel values without a need for analog to digital conversion.

According to Wong, the fully-parallel interface coupled with the use of analog registers for arithmetic operations has allowed the SCAMP-5 to achieve superior outcomes on key performance metrics, particularly in terms of frame rate and power consumption. The SCAMP-5 architecture allows for the transfer of a complete image frame from the image sensor array to the processor array in one clock cycle (100 ns), which equates to a sensor processing bandwidth of 655 GB/s (Martel and Dudek, 2016). This allows for the implementation of vision algorithms at extremely high frame rates which are simply unattainable with traditional architectures. For example, Carey et al. (2013a) demonstrated an object-tracking algorithm running at 100,000 fps. On the other hand, when operating at lower frame rates, the SCAMP-5 can function at ultra-low power consumption rates. Carey et al. (2013b) demonstrated a vision system capable of carrying out loiterer detection, which operated continuously at 8 frames per second for 10 days powered by three standard AAA batteries. These superior performance characteristics have positioned the SCAMP-5 as an ideal device for implementing vision algorithms in low-power embedded computing systems (Martel and Dudek, 2016).

SCAMP-5 and other FPSP chips are known as neighbor-in-space FPSP devices because they perform operations at the pixel level and will perform processing within a single frame of data. Each pixel processing element has the ability to reference and perform operations for neighboring pixels in space. To this point, sub-frame processing for composite image creation has not required neighbor-in-space processing and, as a result, has been unable to benefit significantly from a neighbor-in-space FPSP implementation. In contrast, sub-frame processing requires neighbor-in-time processing whereby pixel (m,n) in a sub-frame is processed along with pixels (m,n) from other sub-frames within a collection of sub-frames collected within an imaging window for a composite image or a collection of composite images.

Figure 10:
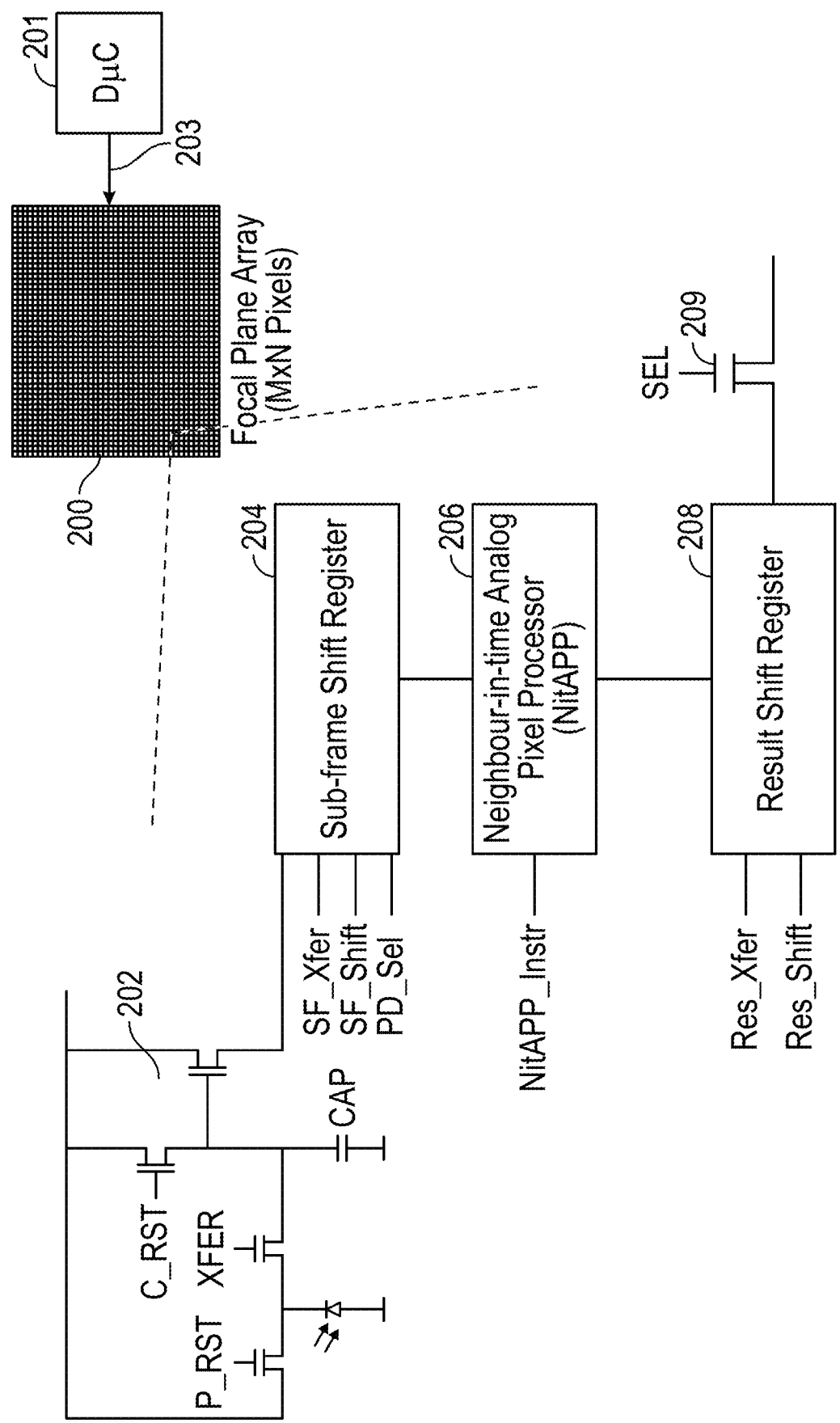
FIG. 10 illustrates a functional diagram for an embodiment of a pixel in a neighbor-in-time analog pixel processing (NitAPP) configuration.

FIG. 10 illustrates a functional diagram for a pixel in a neighbor-in-time analog pixel processing configuration. In embodiments, each pixel in a focal plane array 200 consists of a photodetector integration circuit 202, a sub-frame shift register 204 used for the collection of the K sub-frames, a result shift register 208 that is used to prepare result data for transfer off the focal plane array 200, an output select transistor 209 for enabling bit 0 of the result shift register 208 onto an output transfer bus, and analog elements in a neighbor-in-time analog pixel processor 206 (NitAPP). In embodiments, NitAPP 206 refers to the analog processing elements used for neighbor-in-time analog processing and NitAPP Pixel refers to circuitry that includes NitAPP 206, photodetector integration circuit 202, sub-frame shift register 204, result shift register 208, and output select transistor. Instructions for each NitAPP are provided by a J-bit instruction word provided by an instruction bus 203 from a digital microcontroller 201 (DµC).

Figure 11:
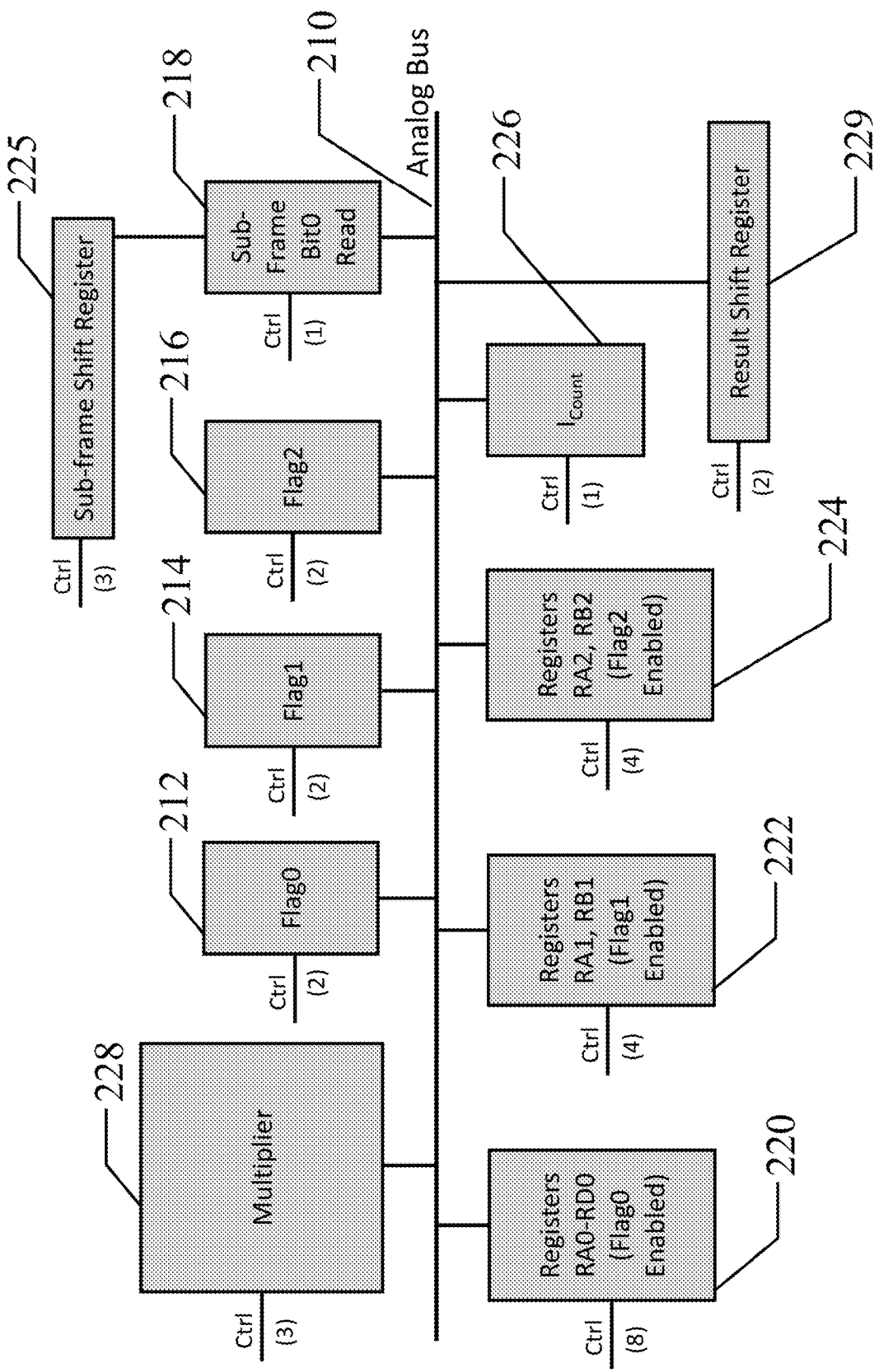
FIG. 11 illustrates a detailed block diagram of an embodiment of NitAPP circuitry showing analog storage and processing elements connected to an analog bus.

FIG. 11 illustrates a detailed NitAPP block diagram showing analog storage and processing elements connected to an analog bus 210. In embodiments, the NitAPP circuitry is used to execute instructions that will operate on a K-bit sub-frame composite image and will determine a white point value, a black point value, and a trapezoid center of mass (CoM) value. NitAPP elements include a multiplier 228 with three bits of control, Flag0 212, Flag1 214, and Flag2 216 logic elements that include compare logic and storage of flag bits used for conditional execution of instructions, sub-frame bit 0 read 218 which enables bit 0 of the sub-frame shift register 225 onto the analog bus 210, three register sets 220, 222, 224 enabled by, respectively Flag0 212, Flag 1 214 and Flag 2 216. $I_{count}$ 226 represents an electrical current source that is used to implement a sub-frame counter utilizing analog levels. In embodiments, the only connection to a digital control module or a digital micro-sequencer is through the digital control signals that make up the J-bit instruction word. In embodiments, all math and logic within NitAPP is performed using analog electrical current levels and analog electrical voltage levels.

Figure 12:
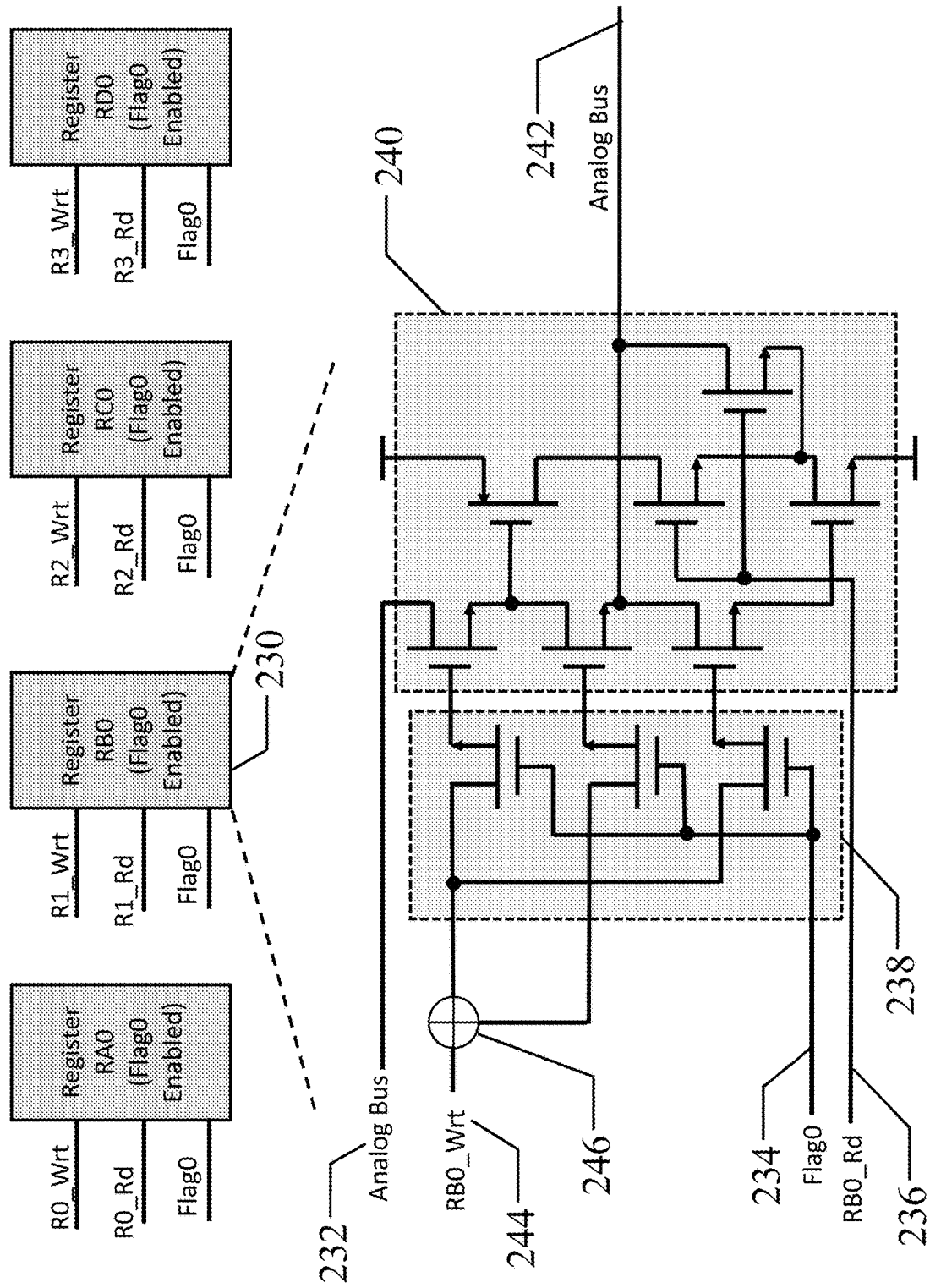
FIG. 12 illustrates an $S^2I$ description of register circuitry according to an embodiment.

In embodiments, switched current SI circuitry is used to convey basic functionality. In practice, more complex circuitry is used in order to reduce processing errors, to increase accuracy, and to reduce power dissipation. FIG. 12 illustrates an $S^2I$ description of register circuitry. In embodiments, a functional depiction of register RB0 230 is shown in an exploded view that illustrates all of the transistor components that comprise the register 230. The write operation is performed in two phases, with a three-transistor phase generator 246 provided to split the RB0_Wrt 244 digital signal into two phases for the write operation. The input transistor block 238 shows two phase 0 transistors and one phase 1 transistor that are enabled by a high level on the Flag0 234 signal supplied to the gate of each transistor. An active RB0_Wrt 244 signal with an active Flag0 234 signal allows the analog value on the analog bus 232 to be written to the storage portion 240 of the register 230. An active high level on the digital RB0_Rd 236 signal enables the stored register 230 value onto the analog bus 242. In embodiments, for the RA0, RB0, RC0, RD0 registers, the input signals RA0_Wrt, RA0_Rd, RB0_Wrt, RB0_Rd, RC0_Wrt, RC0_Rd, RD0_Wrt and RD0_Rd are digital signals that make up part of the digital instruction word and Flag0 is an analog signal provided by the Flag0 compare logic.

Figure 13:
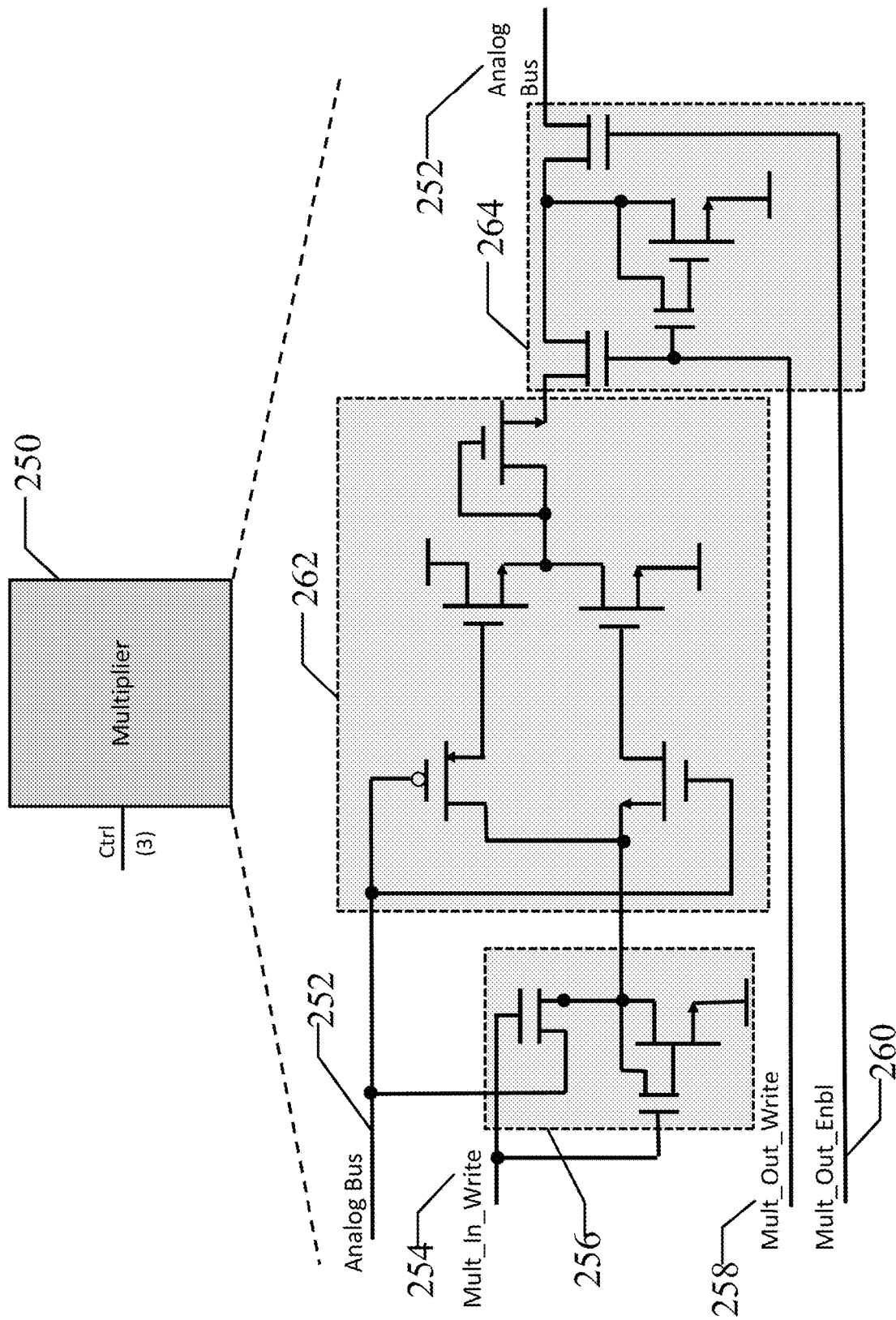
FIG. 13 illustrates an analog multiplier functional block and a $S^2I$ description of a multiplier according to an embodiment.

FIG. 13 illustrates an analog multiplier 250 functional block and a $S^2I$ description of a multiplier. In embodiments, the multiplier 250 circuitry performs analog multiplication between a stored analog value and an analog value presented by an analog bus 252. In embodiments, multiplier circuitry consists of stored input value circuitry 256, analog multiplication circuitry 262, and result circuitry 264. In embodiments, an input value is stored when Multi_In_Write 254 is activated. In embodiments, an output value is stored when Multi_Out_Write 258 is activated. In embodiments, an output value is enabled onto the analog bus 252 when Multi_In_Enbl 260 is activated. In embodiments, input value circuitry 256 and output value circuitry 264 are shown utilizing three-transistor SI logic. In other embodiments, other known forms of input and output circuitry utilizing $S^2I$, $S^3I$ or other storage circuitry constructs for storage of analog values may be utilized.

Figure 14:
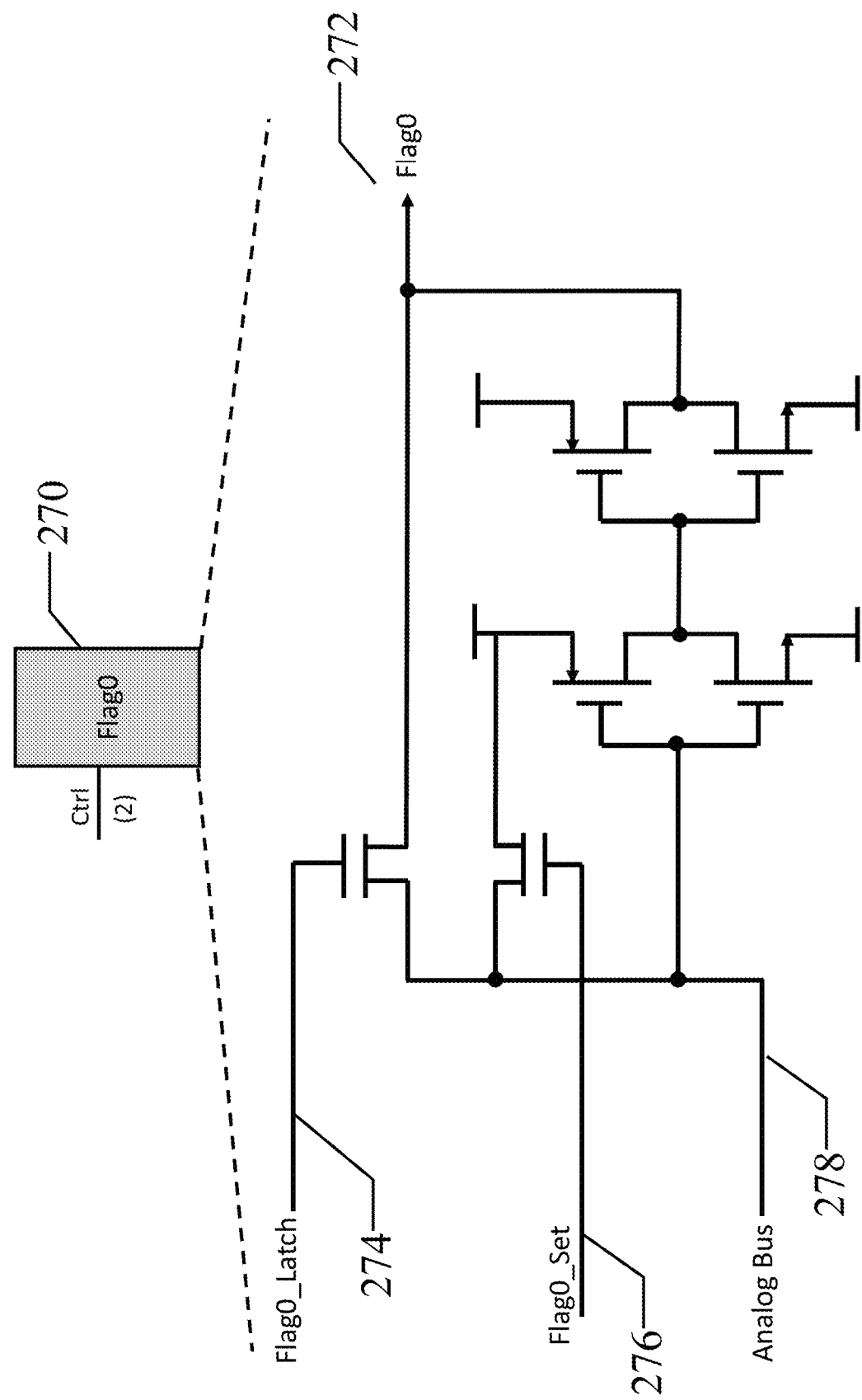
FIG. 14 illustrates a compare-and-flag functional block and a $S^2I$ description of compare and flag circuitry according to an embodiment.

FIG. 14 illustrates a compare-and-flag 270 functional block and a SI description of compare and flag circuitry. In embodiments, the Flag0 270 register is implemented as a D-latch. It can be set globally by activating the Flag0_Set 276 signal. In embodiments, during a comparison instruction the Flag0 272 value is charged toward VDD or discharged toward ground, depending on the sign of the current from the analog bus 278. The Flag0 272 value is stored in the register by activating the Flag0_Latch 274 signal.

Figure 15:
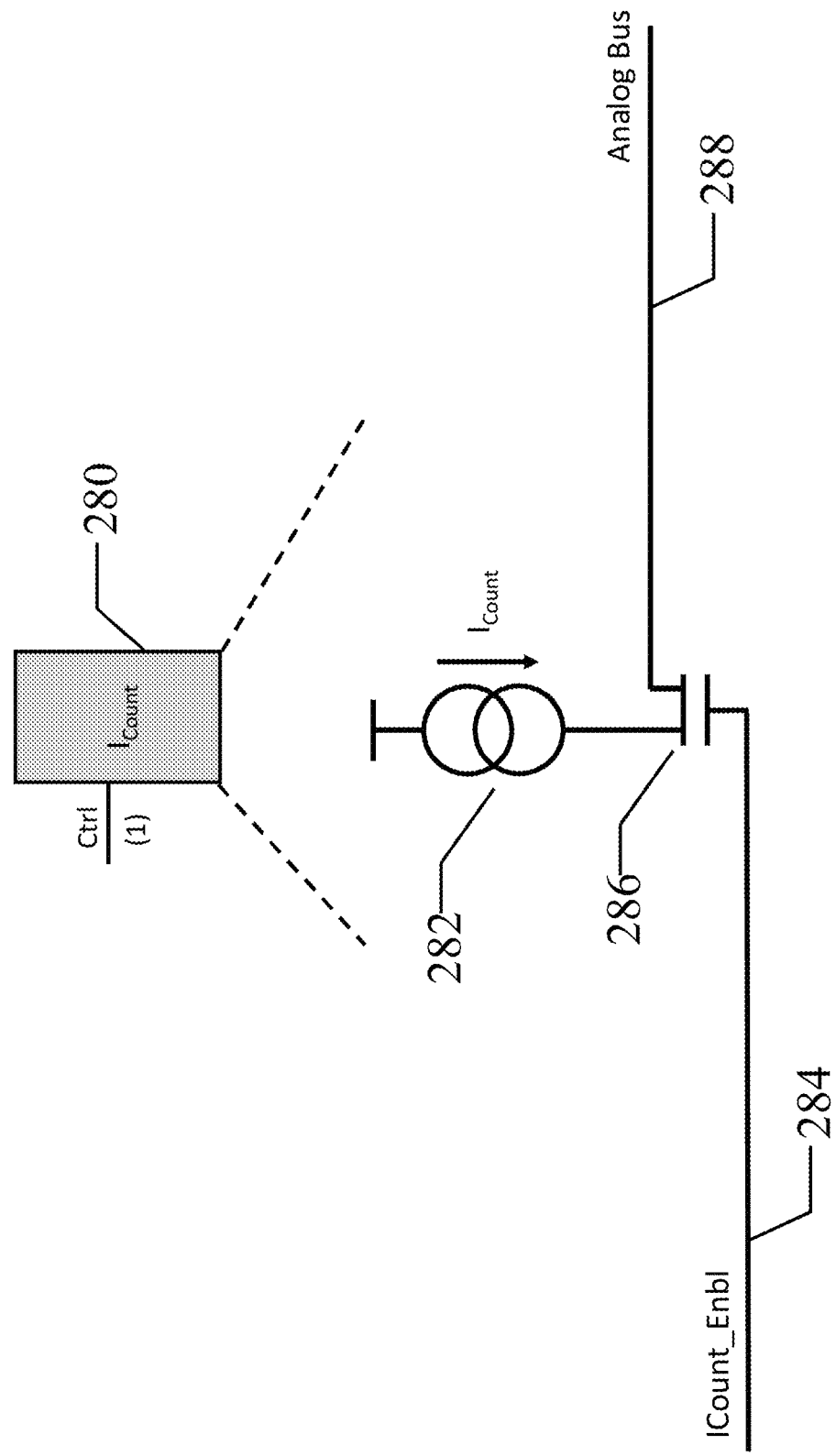
FIG. 15 illustrates a current source functional block and a SI description of enabling a known current source onto an analog bus according to an embodiment.

FIG. 15 illustrates a current source 280 functional block and a SI description of enabling a known current source onto an analog bus. In embodiments, the current source 282 value is selected at a level that is large enough to achieve sufficient granularity for determining loop count values and is small enough to accommodate the accumulations of multiple $I_{Count}$ values in a loop counter register. Stated another way, the $I_{Count}$ value is selected according to:

$$I_{Count} < I_{max}/K \qquad \text{Eq. 17}$$

Where $I_{max}$ is the maximum current value for an analog storage register

K is the number of sub-frames for algorithms that require an analog loop counter In embodiments, $I_{Count}$ is enabled onto the analog bus 288 when the ICount_Enbl 284 signal is activated. An exemplary analog count circuit for use in this embodiment may consist of a single stage amplifier with a large capacitive feedback that accumulates a charge that is proportional to the number of pulses counted for each event enabled by the Flag0_Set 276 signal. Other examples of analog counter circuits may also be used in various embodiments, such as are shown and described in U.S. Pat. No. 7,634,061, the contents of which are hereby incorporated by reference.

When using a DµC for providing instructions to M×N NitAPP elements, all NitAPPs perform the same instruction simultaneously. In embodiments, conditional operations are handled by using information from the Flag0, Flag1, and Flag2 bits, which enable or disable operations for register banks. In embodiments, registers are used for storing intermediate results, are used for event counters, and are used for conditional instruction execution based on flag bits. In embodiments, a 32-bit digital instruction word is routed to each of the M×N NitAPP elements, whereby each instruction bit controls the gate input to a switching transistor or controls current flow from the source to the gate for an MOS transistor. In embodiments, the definition of the bits for a 32-bit digital instruction word is:

| Bit # | NitAPP Instruction switch | Function |
| --- | --- | --- |
| 0 | SFSR_Xfer | Sub-frame Shift Register Transfer |
| 1 | SFSR_Shift | Sub-frame Shift Register Bit Shift |
| 2 | SFSR_PD_Sel | Sub-frame Shift Register Photodetector Select |
| 3 | SFSR_Rd | Sub-frame Shift Register Bit 0 Enable to Analog Bus |
| 4 | Mult_In_Wrt | Write Input Value to Multiplication Block |
| 5 | Mult_Out_Wrt | Write Output Value from Multiplication Block |
| 6 | Mult_Out_Rd | Enable Multiplication Output to Analog Bus |
| 7 | Flag0_Latch | Latch Flag0 Based on Compare Circuit |
| 8 | Flag0_Set | Set Flag0 |
| 9 | Flag1_Latch | Latch Flag1 Based on Compare Circuit |
| 10 | Flag1_Set | Set Flag1 |
| 11 | Flag2_Latch | Latch Flag2 Based on Compare Circuit |
| 12 | Flag2_Set | Set Flag2 |
| 13 | RA0_Rd | Enable Register A0 to Analog Bus |
| 14 | RA0_Wrt | Write Analog Bus Value to Register A0 |
| 15 | RB0_Rd | Enable Register B0 to Analog Bus |
| 16 | RB0_Wrt | Write Analog Bus Value to Register B0 |
| 17 | RC0_Rd | Enable Register C0 to Analog Bus |
| 18 | RC0_Wrt | Write Analog Bus Value to Register C0 |
| 19 | RD0_Rd | Enable Register D0 to Analog Bus |
| 20 | RD0_Wrt | Write Analog Bus Value to Register D0 |
| 21 | RA1_Rd | Enable Register A1 to Analog Bus |
| 22 | RA1_Wrt | Write Analog Bus Value to Register A1 |
| 23 | RB1_Rd | Enable Register B1 to Analog Bus |
| 24 | RB1_Wrt | Write Analog Bus Value to Register B1 |

| Bit # | NitAPP Instruction switch | Function |
|---|---|---|
| 25 | RA2_Rd | Enable Register A2 to Analog Bus |
| 26 | RA2_Wrt | Write Analog Bus Value to Register A2 |
| 27 | RB2_Rd | Enable Register B2 to Analog Bus |
| 28 | RB2_Wrt | Write Analog Bus Value to Register B2 |
| 29 | ICount_Enbl | Enable Icount Current to Analog Bus |
| 30 | Result_SR_Xfer | Result Shift Register Transfer |
| 31 | Result_SR_Shift | Result Shift Register Bit Shift |

In embodiments, pseudocode for DµC instructions that perform black point, white point, and CoM computations for each pixel, along with the associated NitAPP instruction values, is shown below:

DuC Pseudocode

Constants:
- K = number of sub-frames per composite image
- M = number of columns of pixels in FPA
- N = number of rows of pixels in FPA

| | DuC instruction | DuC Comment | NitAPP Inst | NitAPP Switches | NitAPP Comments |
|---|---|---|---|---|---|
| | k = 0 | initialize loop count for BP, WP | | | |
| | Initialize Flag0[m,n] | | Set Flag0 | Flag0_Set | Enable Flag0 Registers |
| | Initialize Flag1[m,n] | | Set Flag1 | Flag1_Set | Enable Flag1 Registers |
| | Initialize Flag2[m,n] | | Set Flag2 | Flag2_Set | Enable Flag2 Registers |
| | BlackPoint[m,n] = 0x3FF | initialize BP to a high value | Icount –> Mult | Mult_In_Wrt, Icount_Enbl | Icount to Mult input |
| | | | Mult * Icount –> Mult | Mult_Out_Wrt, Icount_Enbl | Mult = Icount squared |
| | | | Mult –> RC0 | Mult_Out_Rd, RC0_Wrt | RC0 = BlackPoint[m,n] |
| | WhitePoint[n,m] = 0 | initialize WP to a low value | Icount –> RA0 | RA0_Wrt, Icount_Enbl | RA0 = Icount – Icount |
| | | | RA0 + Icount –> RD0 | RA0_Rd, Icount_Enbl, RD0_Wrt | RB2 = WhitePoint[m,n] |
| LoopWP | Read i[m,n,k] | read bit K from shift register | | | |
| | If i[m,n,k] < BlackPoint[m,n] | bit k lowest so far? | SFSR < RC0 | Flag0_Latch, SFSR_Rd, RC0_Rd | Check for new BlackPoint |
| | BlackPoint[m,n] = i[m,n,k] | if yes, make bit k new lowest | SFSR –> RC0 | SFSR_Rd, RC0_Wrt | Conditional BlackPoint update |
| | endif | | Set Flag0 | Flag0_Set | Enable Flag0 Registers |
| | If i[m,n,k] > WhitePoint[m,n] | bit k highest so far? | SFSR > RD0 | Flag0_Latch, SFSR_Rd, RD0_Rd | Check for new WhitePoint |
| | WhitePoint[m,n] = i[m,n,k] | if yes, make bit k new highest | SFSR –> RD0 | SFSR_Rd, RB2_Wrt | Conditional WhitePoint update |
| | endif | | Set Flag0 | Flag0_Set | Enable Flag0 Registers |
| | k = k+1 | increment sub-frame counter | | | |
| | Shift SFShiftRegister[m,n] | circular shift of K shift register | Circular Shift of SFSR | SFSR_Xfer | SFSR circular transfer |
| | If k<K, GoTo LoopWP | end of | | SFSR_Shift | SFSR circular shift |
| | | | RC0 –> Result_SR | Result_SR_Xfer, RC0_Rd | Send BlackPoint[m,n] to output shift register |
| | | | Shift Output SR | Result_SR_Shift | |
| | | | | Result_SR_Xfer, | Send WhitePoint[m,n] to |

-continued

| | | | DuC Pseudocode | | |
|---|---|---|---|---|---|
| | | | RD0 -> Result_SR | RD0_Rd Result_SR_Shift | output shift register |
| | | | Shift Output SR | | |
| | MidHeight[m,n] = (WhitePoint[m,n] − BlackPoint[m,n]) / 2 | mid-height intensity value | RC0 -> RB0 | RC0_Rd, RB0_Wrt | Negate BlackPoint[m,n] |
| | | | RC0 = (RB0 + RD0)/2 | RC0_Wrt, RA0_Wrt, RB0_Rd, RD0_Rd | RC0 = MidHeight[m,n] |
| | LeadEdgeMidPassed[m,n] = FALSE | initialize leading edge CoM flag | Set Flag1 | Flag1_Set | Flag1 = LeadEdgeMidPassed[m,n] = FALSE |
| | k = 0 | initialize loop count for CoM | | | |
| | SFCount[m,n] = 0 | initialize NitAPP SF counter | Icount -> RA0 | Icount_Enbl, RA0_Wrt | |
| | | | RD0 = Icount + RA0 | Icount_Enbl, RD0_Wrt, RA0_Rd | RD0 = SFCount[m,n] = 0 |
| | TrailEdgeActive[m,n] = FALSE | initialize search for trailing edge | RA0 > 0 | Flag2_Latch, RA0_Rd | Flag2 = TrailEdgeActive[m,n] |
| | LastI[m,n] = BlackPoint[m,n] | initialize intensity value for sf−1 | RC0 -> RA2 | RC0_Rd, RA2_Wrt | RA2 = LastI[m,n] |
| LoopLead | If LeadEdgeMidPassed[m,n] = FALSE, Do | | | | |
| | If i[m,n,k] > MidHeight[m,n] | Leading edge crossed midpoint? | RC0 -> RA0 | RC0_Rd, RA0_Wrt | Negate MidHeight[m,n] |
| | | | SFSR > RA0 | Flag0_Latch, SFSR_Rd, RA0_Rd | |
| | LeadEdgeMidPassed[m,n] =TRUE | | Icount -> RA0 | Icount_Enbl, RA0_Wrt | |
| | | | RA0 > 0 | Flag1_Latch, RA0_Rd | LeadEdgeMidPassed[m,n] = TRUE |
| | TrailEdgeActive[m,n] = TRUE | | Set Flag2 | Flag2_Set | |
| | LeadingCrossover[m,n] = SFCount[m,n] + $I_{Count}$*{(MidHeight[m,n] − LastI[m,n])/(i[m,n,k] − LastI[m,n])} | | | | |
| | | | RA2 -> RA0 | RA2_Rd, RA0_Wrt | Negate LastI[m,n] |
| | | | RB0 = SFSR + RA0 | RB0_Wrt, SFSR_Rd, RA0_Rd | RB0 = SFSR − LastI[m,n] |
| | | | Invert RB0 | RB0_Rd, RB0_Wrt, Mult_In_Wrt, Mult_Out_Wrt, Mult_Out_Rd | |
| | | | RB0 -> Mult_In | RB0_Rd, Mult_In_Wrt | |
| | | | RB2 = RA1 + RA0 | RB2_Wrt, RA1_Rd, RA0_Rd | RB2 = MidHeight[m,n] − LastI[m,n] |
| | | | RB0 = Icount* (RB2/RB0) | RB2_Rd, Mult_Out_Wrt, Icount_Enbl | |
| | | | RB1 = RD0 + RB0 | RB1_Wrt, RD0_Rd, RB0_Rd | |
| | endif | | | | |
| | endif | | | | |
| | If TrailEdgeActive[m,n] = TRUE, Do | | | | |
| | If i[m,n,k] < MidHeight[m,n] | Trailing edge crossed midpoint? | SFSR -> RA0 | SFSR_Rd, RA0_Wrt | Negate SFSR |
| | | | RA0 > RC0 | Flag1_Latch, SFSR_Enbl, RC0_Rd | |
| | TrailingCrossover[m,n] = SFCount[m,n] + $I_{Count}$*{(MidHeight[m,n] − LastI[m,n])/(i[m,n,k] − LastI[m,n])} | | RA2 -> RA0 | RA2_Rd, RA0_Wrt | Negate LastI[m,n] |
| | | | | RB0_Wrt, SFSR_Rd, | |

-continued

| DuC Pseudocode | | | | |
|---|---|---|---|---|
| | | RB0 = SFSR + RA0 | RA0_Rd | RB0 = SFSR − LastI[m,n] |
| | | | RB0_Rd, RB0_Wrt, Mult_In_Wrt, | |
| | | Invert RB0 | Mult_Out_Wrt, Mult_Out_Rd | |
| | | | RB0_Rd, | |
| | | RB0 −> Mult_In | Mult_In_Wrt | |
| | | | RB2_Wrt, | |
| | | | RA1_Rd, | RB2 = MidHeight[m,n] − |
| | | RB2 = RA1 + RA0 | RA0_Rd | LastI[m,n] |
| | | | RB2_Rd, | |
| | | RB0 = Icount * | Mult_Out_Wrt, | |
| | | (RB2/RB0) | Icount_Enbl | |
| | | | RB2_Wrt, | |
| | | | RD0_Rd, | |
| | | RB2 = RD0 + RB0 | RB0_Rd | |
| | | | Icount_Enbl, | |
| TrailEdgeActive[m,n] = FALSE | | Icount −> RA0 | RA0_Wrt | |
| | | | Flag2_Latch, | LeadEdgeMidPassed[m,n] |
| | | RA0 > 0 | RA0_Rd | = TRUE |
| endif | | | | |
| endif | | | | |
| | increment sub-frame counter | | | |
| k= k+1 | | | SFSR_Xfer | SFSR circular transfer |
| Shift SFShiftRegister[m,n] | circular shift of K shift register | Circular Shift of SFSR | SFSR_Shift | SFSR circular shift |
| | increment sub-frame counter | | RD0_Rd, | |
| SFCount[m,n] = SFCount[m,n] + $I_{Count}$ | | RD0 −> RA0 | RA0_Wrt | Negate SFCount[m.n] |
| | | | RB0_Wrt, | |
| | | RB0 = RA0 + Icount | RA0_Rd, Icount_Enbl | |
| | | | RB0_Rd, | |
| | | RB0 −> RD0 | RD0_Rd | |
| If k<K, GoTo LoopLead | end of | | | |
| CoM[m,n] = TrailingCrossover[m,n] − LeadingCrossover[m,n] | | RB1 −> RA0 | | Negate LeadingCrossover[m,n] |
| | | RA1 = RA0 + RB2 | | RA1 = CoM[m,n] |
| | | | Result_SR_Xfer, | Send CoM[m,n] to output |
| | | RA1 −> Result_SR | RA1_Rd | shift register |
| | | Shift Output SR | Result_SR_Shift | |

Figure 16:
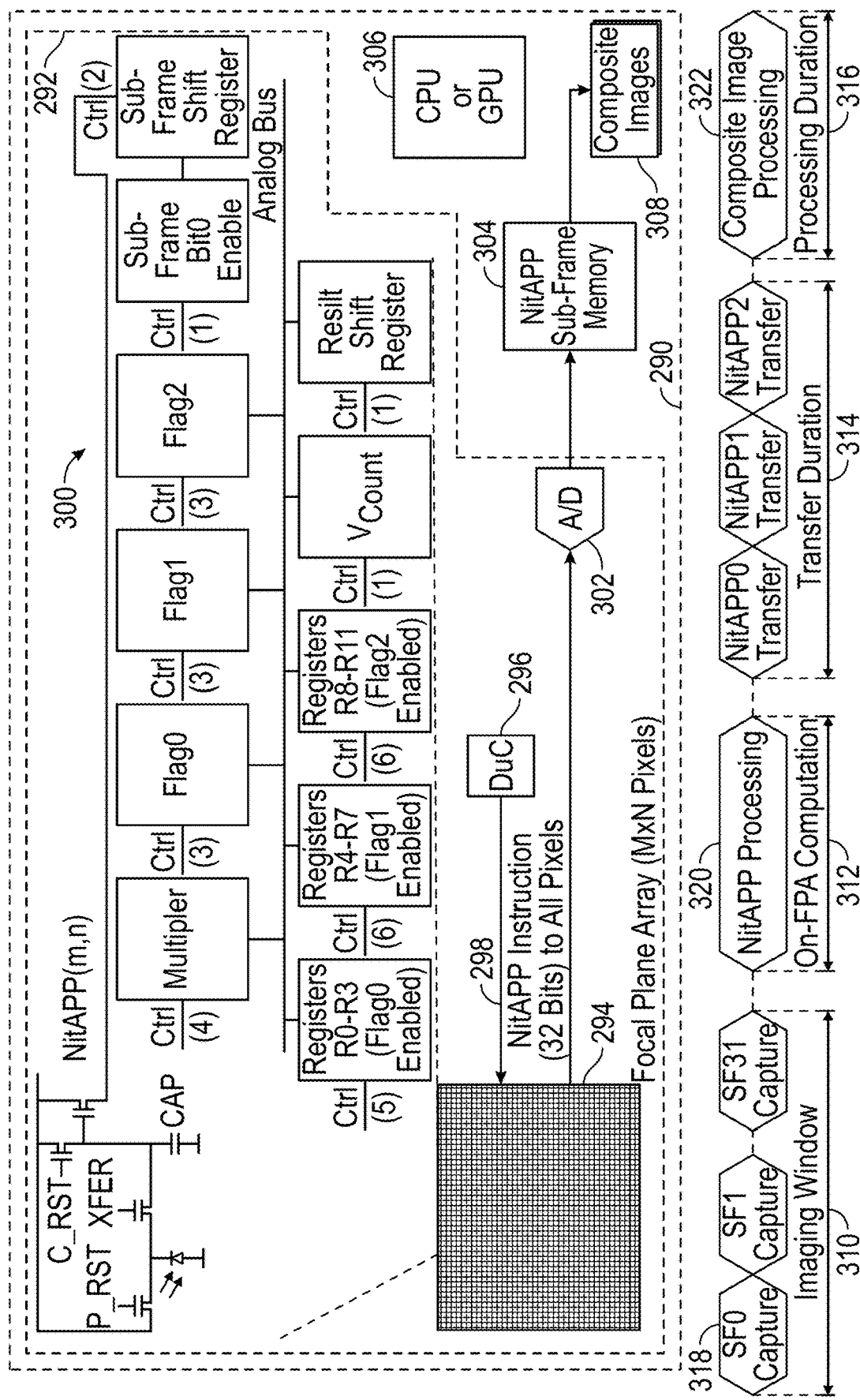
FIG. 16 illustrates components of embodiments for a sub-frame-processing, composite imaging system that utilizes NitAPP processing.

FIG. 16 illustrates components of embodiments for a sub-frame-processing, composite imaging system 290 that utilizes NitAPP processing. The system 290 includes a mixed signal focal plane array 292 front end and a digital sub-frame-processing back end. In embodiments, digital elements include NitAPP result sub-frame memory 304 for storing digitally converted results from the NitAPP processing, CPU/GPU 306 for digital result processing for creating final images, and composite image memory for storing the results of composite image 308 creation. In embodiments, a focal plane array 294 consists of M×N pixels, where M is the number of columns and N is the number of rows of photodetector elements. In embodiments, each pixel consists of a NitAPP(m,n) element 300 that includes a photodetector, photodetector control circuitry, and NitAPP processing circuitry. In embodiments, a digital microcontroller 296 executes instructions that determine the algorithmic processing functions that are simultaneously performed at each NitAPP(m,n) element 300. In embodiments, NitAPP functions are controlled via a 32-bit instruction bus 298. In embodiments, analog information that is read from the result registers of the NitAPP(m,n) elements 300 is converted to digital form via one or more A/D converters 302 prior to transmitting from the focal plane array 292 to the digital back end.

In embodiments, there are four sequential time durations of the system 290—an analog focal plane array imaging window 310, an on-FPA computation duration for NitAPP processing 312, an off-chip transfer 314 and A/D conversion, and a digital processing duration 316. The overall throughput and composite image rate for a device is determined by the durations of the four stages 310, 312, 314 and 316. In embodiments, a duration for an imaging window establishes the time it takes for all K sub-frames to be integrated and shifted into analog shift registers located at each NitAPP pixel 300. In embodiments, considerations for an imaging window duration 174 are determined by the amount of motion expected in a scene, the amount of motion expected for a composite camera, and the desired maximum horizontal and vertical pixel movement for from sub-frame zero through sub-frame K−1. In embodiments, an imaging window of 160 μSec for automotive applications meets the sub-frame horizontal and vertical alignment guidelines for forward-facing and rear-facing camera applications. In embodiments, NitAPP processing is the amount of time required for the DuC 296 to issue all of the instructions to the NitAPP[m,n] elements for the desired algorithmic processing and control functionality for on-pixel, sub-frame processing. In embodiments, transfer duration 314 specifies the time it takes to read result information from all pixels and transfer all sub-frames off a focal plane array 292 and into NitAPP result memory 304. In embodiments, processing duration 316 is the time it takes to digitally produce composite images 308 from the information contained in the NitAPP result memory 304.

In embodiments, NitAPP architecture displays significant throughput advantages versus digital sub-frame-processing systems. As an example, a throughput comparison is presented for NitAPP-processed and digitally-processed images for a 16 megapixel composite imaging system with K=32 sub-frames per composite image according to these parameters:

| | |
|---|---|
| Focal Plane Array size | 16,777,216 pixels |
| Bits per pixel for A/D Conversion | 12 bits/pixel |
| Bytes per pixel | 1.5 Bytes/pixel |
| Focal Plane Array bus transfer rate | 5 GB/sec |
| Number of sub-frames per composite image | 32 sub-frames |

In embodiments, the duration comparisons are made for comparative algorithms to determine black point, white point and center of mass (CoM) for each of the 16 megapixels. The overall durations for two imaging systems are:

| | Digital Sub-frame | NitAPP |
|---|---|---|
| Imaging Window | 0.16 ms | 0.16 ms |
| On-FPA Computation | 0 ms | 0.10 ms |
| Transfer Duration | 150 ms | 14.06 ms |
| Processing Duration | 163.84 ms | 3.28 ms |
| Total Elapsed Time | 314.0 ms | 17.6 ms |
| Images/second - no pipeline | 3.2 | 56.7 |
| Images/second - pipelined | 6.1 | 71.1 |

In embodiments, on-FPA computation for NitAPP consists of the duration required to execute the NitAPP instructions for a black point, white point and CoM algorithm. The duration (in μSec) of the algorithm is computed according to:

$$t(m,n)_{NitAPP} = \text{OpNum}_{NitAPP}/\text{MFLOP}_{NitAPP} \qquad \text{Eq. 18}$$

Where $\text{OpNuM}_{NitAPP}$ is the number of NitAPP instructions to perform an algorithm $\text{MFLOP}_{NitAPP}$ stands for Mega-FLOPs and is the number of millions of floating point operations per second for a single NitAPP processing element For the WP/BP/CoM algorithm presented herein, the number of NitAPP operations is 1012, which is 9 instructions for BP/WP start, 256 instructions (8 instructions times 32 loops) for the WP/BP loop, 4 instructions for WP/BP end, 736 instructions (23 instructions times 32 loops) for the CoM loop, and 7 for CoM end. Utilizing a NitAPP instruction clock of 10 MHz results in a $\text{MFLOP}_{NitAPP}$ equal to 10. Eq. 17 results in an on-FPA computation time of 101.2 μs. For a camera system with M equal to 4096 pixels, N equal to 4096 pixels, and a frame processor that includes 1024 CPU/GPU cores with each core running at 50 MFLOPs, the digital sub-frame processing duration is 163.84 milliseconds based on a per-pixel algorithm of 500 instructions. When utilizing NitAPP for on-FPA processing, the digital back end has a reduced processing duration because fewer instructions are required per pixel. In embodiments, if the digital processing back end requires 10 instructions per pixel to perform composite image creation, the CPU/GPU processing duration is reduced to 3.28 milliseconds.

The elapsed time of 17.6 milliseconds for NitAPP sub-frame processing results in an overall performance specification for a 32 sub-frame processing, composite image-generating 3D camera of approximately 56.7 composite images per second. For applications that require performance of 30 images per second, 56.7 images per second more than meets the requirements. In embodiments, camera architecture may be modified for pipelined processing whereby sequential stages in a process are overlapped in time by utilizing extra storage and/or additional electronics, typically at the expense of higher components costs and higher electrical current requirements. In embodiments, total elapsed time for pipelined operation for NitAPP processing may be reduced to 14.06 milliseconds, which is the elapsed time for the stage with the longest elapsed time. The elapsed time of 14.06 milliseconds results in an overall performance specification for a 32 sub-frame processing, composite image-generating 3D camera of approximately 71.1 composite images per second, which is sufficient for meeting the throughput rate for 60 image-per-second imaging applications.

Digital CPUs and GPUs typically attempt to extract top performance out of a given technology, often at the expense of power consumption. The use of NitAPP processing for composite image creation offers the benefit of lower overall device power consumption because most of the processing is shifted from power-hungry digital processing to very-low-power analog computing. Utilizing a 10 nm feature size silicon fabrication process, the power consumption for various elements can be expressed as:

| Function | Power | Units |
|---|---|---|
| Photodetector accumulation | 80 | pW per accumulation per pixel |
| NitAPP instruction | 6 | pW per NitAPP element |
| Digital Memory Read/Write | 0.45 | nW per byte |
| GPU instruction | 0.08 | nW per instruction |
| FPA transfer and A/D Conversion | 0.85 | nW per byte |

In embodiments, a power consumption comparison for digital sub-frame processing and for NitAPP sub-frame processing for a sixteen megapixel, 32 sub-frame composite image utilizing a 10 nm process is:

| Function | Digital #/img/pixel | Digital mW/image | NitAPP #/img/pixel | NitAPP mW/image |
|---|---|---|---|---|
| FPA accumulations | 1 | 1.3 | 1 | 1.3 |
| NitAPP instructions | 0 | 0 | 1012 | 101.9 |
| FPA Xfer and A/D | 48 | 684.5 | 4.5 | 64.2 |
| Digital Read/Write | 96 | 724.8 | 9 | 67.9 |
| GPU instructions | 500 | 671.1 | 10 | 13.4 |
| Total Power (mW) | | 2081.7 | | 248.8 |

Figure 17:
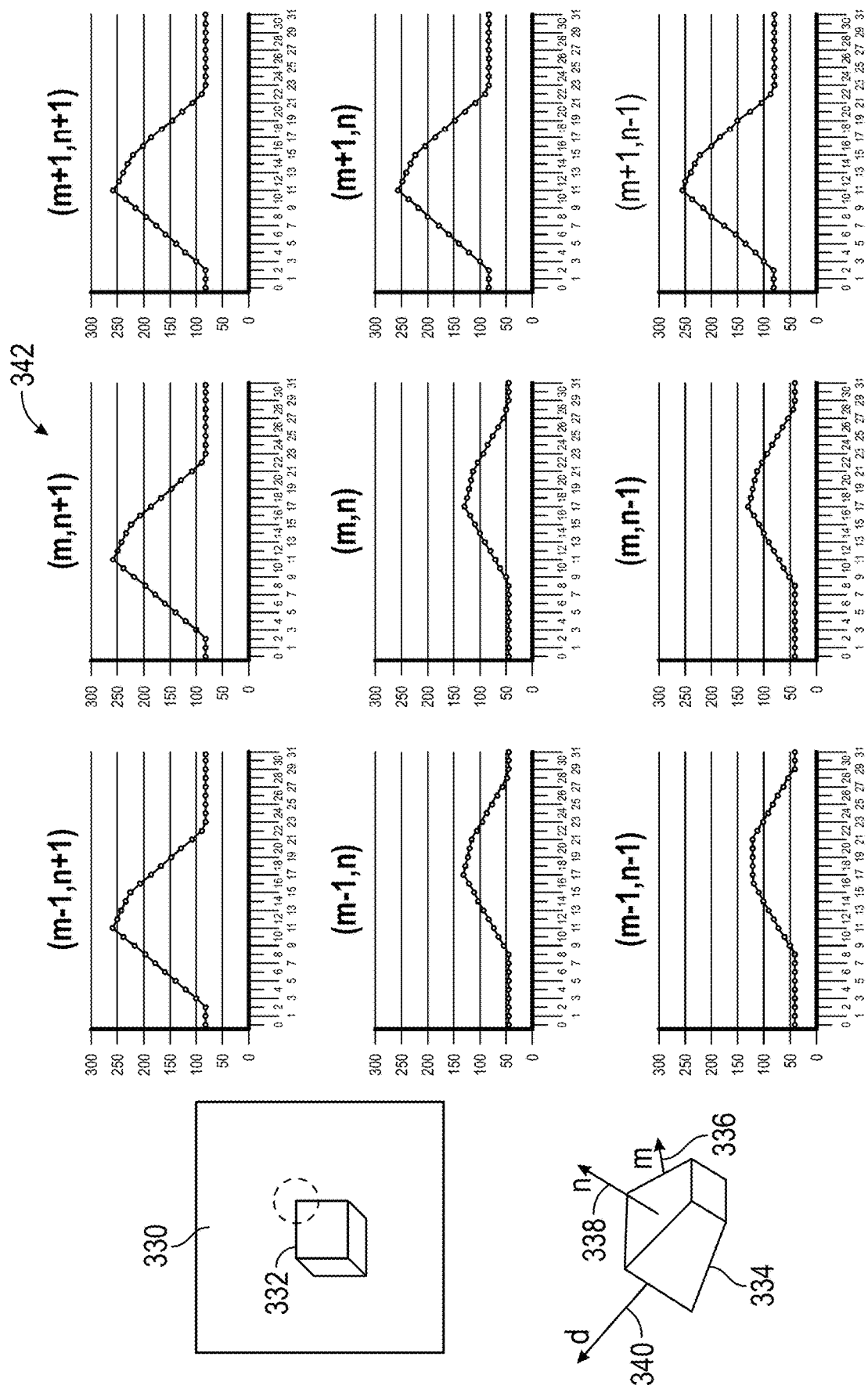
FIG. 17 illustrates a scene that is imaged by a sub-frame composite image camera in accordance with an embodiment.

FIG. 17 illustrates a scene that is imaged by a sub-frame composite image camera 334. Objects in the scene consist of a stationary background object 330 and a foreground object 332. In embodiments, sub-frame processing is utilized to detect and quantify three-axis motion for the foreground object 332 whereby the three axes of motion are determined relative to the camera 334. Camera axis m 336 indicates the direction of motion for increasing values of horizontal camera 334 pixels, camera axis n 338 indicates the direction of motion for increasing values of vertical camera 334 pixels, and camera axis d 340 indicates the direction of motion for increasing values of distance between a camera pixel and an object 330, 332. In embodiments, a sub-frame trapezoid descriptor of 32/8/8/12/1/5 is used for electro-optical sub-frame camera parameters, and intensity vs. sub-frame plots 342 are shown for a 3×3 pixel grouping that corresponds to pixels that represent the upper right corner of a foreground object 332. Trapezoidal analysis for a 3×3 pixel grouping yields the trapezoidal parameters shown in Table 1 below:

TABLE 1

|  | m − 1 | m | m + 1 |
|---|---|---|---|
| n + 1 | $I_{bp-le}$: 80<br>$I_{bp-te}$: 68<br>$I_{wp-le}$: 256<br>$I_{wp-te}$: 224<br>$SF_{le-mid}$: 12.5<br>$SF_{te-mid}$: 24.5 | $I_{bp-le}$: 80<br>$I_{bp-te}$: 68<br>$I_{wp-le}$: 256<br>$I_{wp-te}$: 224<br>$SF_{le-mid}$: 12.5<br>$SF_{te-mid}$: 24.5 | $I_{bp-le}$: 80<br>$I_{bp-te}$: 74<br>$I_{wp-le}$: 256<br>$I_{wp-te}$: 240<br>$SF_{le-mid}$: 12.5<br>$SF_{te-mid}$: 24.5 |
| n | $I_{bp-le}$: 40<br>$I_{bp-te}$: 34<br>$I_{wp-le}$: 128<br>$I_{wp-te}$: 112<br>$SF_{le-mid}$: 6.5<br>$SF_{te-mid}$: 18.3 | $I_{bp-le}$: 40<br>$I_{bp-te}$: 34<br>$I_{wp-le}$: 128<br>$I_{wp-te}$: 112<br>$SF_{le-mid}$: 6.5<br>$SF_{te-mid}$: 18.3 | $I_{bp-le}$: 80<br>$I_{bp-te}$: 68<br>$I_{wp-le}$: 256<br>$I_{wp-te}$: 224<br>$SF_{le-mid}$: 12.5<br>$SF_{te-mid}$: 24.5 |
| n − 1 | $I_{bp-le}$: 40<br>$I_{bp-te}$: 40<br>$I_{wp-le}$: 120<br>$I_{wp-te}$: 120<br>$SF_{le-mid}$: 6.5<br>$SF_{te-mid}$: 18.3 | $I_{bp-le}$: 40<br>$I_{bp-te}$: 34<br>$I_{wp-le}$: 128<br>$I_{wp-te}$: 112<br>$SF_{le-mid}$: 6.5<br>$SF_{te-mid}$: 18.3 | $I_{bp-le}$: 80<br>$I_{bp-te}$: 68<br>$I_{wp-le}$: 256<br>$I_{wp-te}$: 224<br>$SF_{le-mid}$: 12.5<br>$SF_{te-mid}$: 24.5 |

Based on trapezoidal analysis, a slope is computed for each pixel for the white point portion of the trapezoid according to:

$$\text{Slope}_{wp}(m,n) = [I_{te-wp}(m,n) - I_{le-wp}(m,n)] / \Delta SF_{trapezoid-top} \quad \text{Eq. 19}$$

Where $I_{te-wp}(m,n)$ is the trailing edge white point intensity value for pixel (m,n)

$I_{le-wp}(m,n)$ is the leading edge white point intensity value for pixel (m,n)

$\Delta SF_{trapezoid-top}$ is the width of the top of a trapezoid in # of sub-frames White point intensity value analysis for a 3×3 pixel grouping yields the white point slope values shown in Table 2 below, along with computed distances for each pixel in accordance with Eq. 4:

TABLE 2

|  | m − 1 | m | m + 1 |
|---|---|---|---|
| n + 1 | $\text{Slope}_{wp}$: −8<br>Distance: 22.18 m | $\text{Slope}_{wp}$: −8<br>Distance: 22.18 m | $\text{Slope}_{wp}$: −4<br>Distance: 22.18 m |
| n | $\text{Slope}_{wp}$: −4<br>Distance: 14.87 m | $\text{Slope}_{wp}$: −4<br>Distance: 14.87 m | $\text{Slope}_{wp}$: −8<br>Distance: 22.18 m |
| n − 1 | $\text{Slope}_{wp}$: 0<br>Distance: 14.87 m | $\text{Slope}_{wp}$: −4<br>Distance: 14.87 m | $\text{Slope}_{wp}$: −8<br>Distance: 22.18 m |

In embodiments, pixels (m−1, n−1), (m, n−1), and (m+1, n−1) form an m-motion pixel triplet whereby motion is detected along the m-axis due to the zero slope for pixel (m−1, n−1) and non-zero slopes for pixels (m, n−1) and (m+1, n−1) whereby the signs of the non-zero slopes are the same. The m-motion pixel triplet is the result of an object of high intensity migrating from the field of view (FOV) of pixel (m+1, n−1) into the FOV of pixel (m, n−1), or the m-motion pixel triplet is the result of an object of low intensity migrating from the field of view (FOV) of pixel (m, n−1) into the FOV of pixel (m+1, n−1). In embodiments, pixels (m−1, n+1), (m−1, n), and (m−1, n−1) form an n-motion pixel triplet whereby motion is detected along the n-axis due to the zero slope for pixel (m−1, n−1) and non-zero slopes for pixels (m−1, n) and (m−1, n+1) whereby the signs of the non-zero slopes are the same. The n-motion pixel triplet is the result of an object of high intensity migrating from the FOV of pixel (m−1, n+1) into the FOV of pixel (m−1, n), or the n-motion pixel triplet is the result of an object of low intensity migrating from the field of view (FOV) of pixel (m−1, n) into the FOV of pixel (m−1, n+1). In embodiments, the amplitude of the m-motion or the n-motion is computed by determining the sub-frame number at which the extrapolated high-intensity white point trapezoid slope crosses over the trailing edge black point intensity value for the other non-zero slope pixel in the m-motion or n-motion pixel triplet according to Eq. 20 below:

$$\Delta SF_{motion} = [(I_{te-wp}(m,n) - I_{le-wp}(m,n)) * (I_{te-bp}(m,n) - I_{le-wp}(m,n))] / \Delta SF_{trapezoid-top}$$

Where $I_{te-wp}(m,n)$ is the trailing edge white point intensity value for the high-intensity pixel of a non-zero-sloped pixel triplet $I_{le-wp}(m,n)$ is the leading edge white point intensity value for the high-intensity pixel of a non-zero-sloped pixel triplet $I_{te-bp}(m,n)$ is the trailing edge black point intensity value for the low-intensity pixel of a non-zero-sloped pixel triplet $\Delta SF_{trapezoid-top}$ is the width of a trapezoid top, expressed in # of sub-frames, as determined from the derived parameters of a trapezoid descriptor In embodiments, m-axis or n-axis motion is expressed as the number of sub-frame periods required for the intensity value of a pixel to completely replace the intensity value of a neighboring pixel that shares a white point slope sign within a pixel triplet. In embodiments, the amplitude of m-axis or n-axis movement is converted to a length by determining the distance of the in-motion object from the camera and utilizing the angular offset between FOVs of neighboring pixels and is computed by:

$$\text{Motion}_{m-axis}(m,n) = d(m,n) * \sin \Delta \varphi(m,n) \quad \text{Eq. 21}$$

Where $d(m,n)$ is the distance to the nearest pixel of an m-axis triplet $\Delta \varphi(m,n)$ is the angular offset between the centers of m-axis FOVs $$\text{Motion}_{n-axis}(m,n) = d(m,n) * \sin \Delta \theta(m,n) \quad \text{Eq. 22}$$

Where $d(m,n)$ is the distance to the nearest pixel of an n-axis triplet $\Delta \theta(m,n)$ is the angular offset between the centers of m-axis FOVs In embodiments, m-axis and n-axis motion is determined according to the identification of m-axis pixel triplets and n-axis pixel triplets. The amplitude of m-axis and n-axis motion is determined for same-signed, non-zero-sloped pixel pairs within pixel triplets. The determination of sign (indicating direction of motion) of the m-axis or n-axis motion on a pixel basis depends on a distance difference between same-signed, non-zero-sloped pixels. In embodiments, the direction of m-axis or n-axis movement is selected according to determining that the pixel with the shortest distance value is a pixel located on the in-motion object in a scene. Therefore, the direction of m-axis or n-axis movement will be from the pixel with the smaller distance parameter to the pixel with the larger distance parameter.

In embodiments, for m-axis and n-axis motion whereby the same-slope pixel values are at the same distance from the sensor, the pixels likely represent differing intensity values from the same in-motion object. Therefore, the amplitude of the motion is determinable from pixel triplet processing, but the direction of the movement is determined from triplet processing for an in-motion triplet that is nearby in space whereby the distances of same-slope pixels are different.

In embodiments, motion in the d axis is determined by computing the width of a trapezoid as determined by the distance (in sub-frames) between a leading edge midpoint and a trailing edge midpoint and comparing it to the width of an ideal trapezoid for a non-moving object. Pixels associated with objects moving toward a sub-frame processing, composite image camera will exhibit trapezoid widths that are less than the width of an ideal trapezoid, and pixels associated with objects moving away from a sub-frame processing, composite image camera will exhibit trapezoid widths that are greater than the width of an ideal trapezoid. D-axis motion is computed according to Eq. 23 below:

$$\text{Motion}_{d\text{-}axis}(m,n) = (\{[SF_{te\text{-}mid}(m,n) - Sf_{le\text{-}mid}(m,n)] - SF_{mid\text{-}height\text{-}width}\} * C * P_{emitter})/2$$

Where $SF_{te\text{-}mid}(m,n)$ is the sub-frame for the trailing edge midpoint for pixel (m,n)

$Sf_{le\text{-}mid}(m,n)$ is the sub-frame for the leading edge midpoint for pixel (m,n)

$SF_{mid\text{-}height\text{-}width}$ is the width, in number of sub-frames, at the mid-height of an ideal trapezoid C is a constant for the speed of light in a medium $P_{emitter}$ is the emitter clock period In embodiments, d-axis motion is determined on a pixel basis and is not dependent on neighbor-in-space intensity values or neighbor-in-space distance values. Said another way, d-axis motion is detectable and measureable for each pixel in a sub-frame processing, composite imaging system.

In embodiments, sub-frame processing in a composite imaging system interprets sub-frame intensity values to determine, within a single composite image, pixel parameters like intensity, radiance, luminance, distance, m-axis motion (horizontal motion relative to the sensor), n-axis motion (vertical motion relative to the sensor) and d-axis motion (relative motion toward or away from the sensor). In embodiments, sensor pixel parameters are determined from sub-frame intensity waveform parameter analysis according to Table 3 below:

TABLE 3

| Waveform Type | Min. Sub-frames | Waveform Parameters | Pixel Properties |
|---|---|---|---|
| WP/BP | 2 | $I_{bp}(m, n)$<br>$I_{wp}(m, n)$ | Luminance<br>Radiance |
| WP/BP | 3 | $I_{le\text{-}wp}(m, n)$<br>$I_{te\text{-}wp}(m, n)$<br>$I_{bp}(m, n)$ | Luminance<br>Radiance<br>m-axis motion<br>n-axis motion |
| Trapezoid | 5 | $I_{wp}(m, n)$<br>$I_{bp}(m, n)$<br>CoM(m, n) | Luminance<br>Radiance<br>Distance |
| Trapezoid | 6 | $I_{le\text{-}wp}(m, n)$<br>$I_{te\text{-}wp}(m, n)$<br>$I_{bp}(m, n)$<br>CoM(m, n) | Luminance<br>Radiance<br>Distance<br>m-axis motion<br>n-axis motion |
| Trapezoid | 8 | $I_{le\text{-}wp}(m, n)$<br>$I_{te\text{-}wp}(m, n)$<br>$I_{bp}(m, n)$<br>$SF_{le\text{-}mid}(m, n)$<br>$SF_{te\text{-}mid}(m, n)$ | Luminance<br>Radiance<br>Distance<br>m-axis motion<br>n-axis motion<br>d-axis motion |

TABLE 3-continued

| Waveform Type | Min. Sub-frames | Waveform Parameters | Pixel Properties |
|---|---|---|---|
| Non-overlapping Range Gating | 3 | $I_0(m, n)$<br>$I_1(m, n)$<br>$I_{G-1}(m, n)$ | Luminance<br>Radiance<br>Distance |
| eXtended Dynamic Range | 3 | $I_0(m, n)$<br>$I_1(m, n)$<br>$I_2(m, n)$ | XDR Intensity<br>Fill Rate |

Trapezoidal sub-frame collection and subsequent trapezoid parameter determination place high demands on digital-only processing systems. In embodiments, NitAPP architecture displays significant throughput advantages versus digital sub-frame-processing systems. As an example, a throughput comparison is presented for NitAPP-processed and digitally-processed images for a 16 megapixel composite imaging system with K=32 sub-frames per composite image according to these parameters:

| | |
|---|---|
| Focal Plane Array size | 16,777,216 pixels |
| Bits per pixel for A/D Conversion | 12 bits/pixel |
| Bytes per pixel | 1.5 Bytes/pixel |
| Focal Plane Array bus transfer rate | 5 GB/sec |
| Number of sub-frames per composite image | 32 sub-frames |

In embodiments, the duration comparisons are made in Table 4 below for comparative algorithms to determine luminance, radiance, distance, m-axis motion, n-axis motion, and d-axis motion, all within a single composite image, for each of the 16 megapixels.

TABLE 4

| Function | Elapsed Time - Digital | Elapsed Time - NitAPP/Digital |
|---|---|---|
| Sub-frame Capture (32 sub-frames) | 0.16 ms | 0.16 ms |
| Compute NitAPP $I_{wp\text{-}le}(m, n)$ | — | 0.02 ms |
| Compute NitAPP $I_{wp\text{-}te}(m, n)$ | — | 0.02 ms |
| Compute NitAPP $I_{bp}(m, n)$ | — | 0.02 ms |
| Determine NitAPP $SF_{le\text{-}mid}(m, n)$ | — | 0.06 ms |
| Determine NitAPP $SF_{le\text{-}mid}(m, n)$ | — | 0.06 ms |
| Transfer NitAPP sub-frames from FPA (5 sub-frames) | — | 23.43 ms |
| Transfer all sub-frames from FPA (32 sub-frames) | 150 ms | — |
| Compute Digital $I_{wp\text{-}le}(m, n)$ | 32 ms | — |
| Compute Digital $I_{wp\text{-}te}(m, n)$ | 32 ms | — |
| Compute Digital $I_{bp}(m, n)$ | 32 ms | — |
| Determine Digital $SF_{le\text{-}mid}(m, n)$ | 72 ms | — |
| Determine Digital $SF_{le\text{-}mid}(m, n)$ | 72 ms | — |
| Determine $Slope_{wp}(m, n)$ | 4 ms | 4 ms |
| Determine Distance(m, n) | 4 ms | 4 ms |
| Compute Luminance | 4 ms | 4 ms |
| Compute Radiance | 4 ms | 4 ms |
| Determine m-axis motion | 4 ms | 4 ms |
| Determine n-axis motion | 4 ms | 4 ms |
| Determine d-axis motion | 4 ms | 4 ms |
| Total Elapsed Time | 428.16 ms | 51.77 ms |
| Composite Images per Second | 2.34 | 19.32 |

Digital CPUs and GPUs typically attempt to extract top performance out of a given technology, often at the expense of power consumption. The use of NitAPP processing for composite image creation offers the benefit of lower overall device power consumption because most of the processing is shifted from power-hungry digital processing to very-low-power analog computing. Utilizing a 10 nm feature size silicon fabrication process, the power consumption for various elements can be expressed as:

| Function | Power | Units |
|---|---|---|
| Photodetector accumulation | 80 | pW per accumulation per pixel |
| NitAPP instruction | 6 | pW per NitAPP element |
| Digital Memory Read/Write | 0.45 | nW per byte |
| GPU instruction | 0.08 | nW per instruction |
| FPA transfer and A/D Conversion | 0.85 | nW per byte |

In embodiments, a power consumption comparison for digital sub-frame processing and for NitAPP sub-frame processing for a sixteen megapixel, 32 sub-frame composite image utilizing a 10 nm process is shown in Table 5 below.

TABLE 5

| Function | Power Usage - Digital | Power Usage - NitAPP/Digital |
|---|---|---|
| Sub-frame Capture (32 sub-frames) | 1.3 mW | 1.3 mW |
| Compute NitAPP $I_{wp-le}(m, n)$ | — | 20.37 mW |
| Compute NitAPP $I_{wp-te}(m, n)$ | — | 20.37 mW |
| Compute NitAPP $I_{bp}(m, n)$ | — | 20.37 mW |
| Determine NitAPP $SF_{le-mid}(m, n)$ | — | 62.84 mW |
| Determine NitAPP $SF_{le-mid}(m, n)$ | — | 62.84 mW |
| Transfer NitAPP sub-frames from FPA (5 sub-frames) | — | 45.86 mW |
| Transfer all sub-frames from FPA (32 sub-frames) | 684.5 mW | — |
| Compute Digital $I_{wp-le}(m, n)$ | 279.2 mW | — |
| Compute Digital $I_{wp-te}(m, n)$ | 279.2 mW | — |
| Compute Digital $I_{bp}(m, n)$ | 279.2 mW | — |
| Determine Digital $SF_{le-mid}(m, n)$ | 837.5 mW | — |
| Determine Digital $SF_{le-mid}(m, n)$ | 837.5 mW | — |
| Determine Slope$_{wp}$(m, n) | 34.9 mW | 34.9 mW |
| Determine Distance(m, n) | 34.9 mW | 34.9 mW |
| Compute Luminance | 34.9 mW | 34.9 mW |
| Compute Radiance | 34.9 mW | 34.9 mW |
| Determine m-axis motion | 34.9 mW | 34.9 mW |
| Determine n-axis motion | 34.9 mW | 34.9 mW |
| Determine d-axis motion | 34.9 mW | 34.9 mW |
| Total Power per Composite Image | 3442.7 mW | 470.25 mW |

Table 3 identifies a WP/BP waveform with a minimum of three sub-frames. In embodiments, a minimum of three sub-frames enables the determination of m-axis and n-axis motion within a single composite image. As an example of an embodiment, a WP/BP descriptor of 3/50, signifying a white point sub-frame followed by a black point sub-frame followed by a second white point sub-frame with an elapsed time from the start of one sub-frame to the start of a subsequent sub-frame defined as 50 µSec. In embodiments, Eq. 18 is modified by replacing $\Delta SF_{trapezoid-width}$ with $\Delta SF_{wp}$, and a white point slope is computed for each pixel according to:

$$\text{Slope}_{wp}(m,n) = [I_{te-wp}(m,n) - I_{le-wp}(m,n)]/\Delta SF_{wp} \quad \text{Eq. 24}$$

Where $I_{te-wp}(m,n)$ is the trailing edge white point intensity value for pixel (m,n)

$I_{le-wp}(m,n)$ is the leading edge white point intensity value for pixel (m,n)

Figure 18:
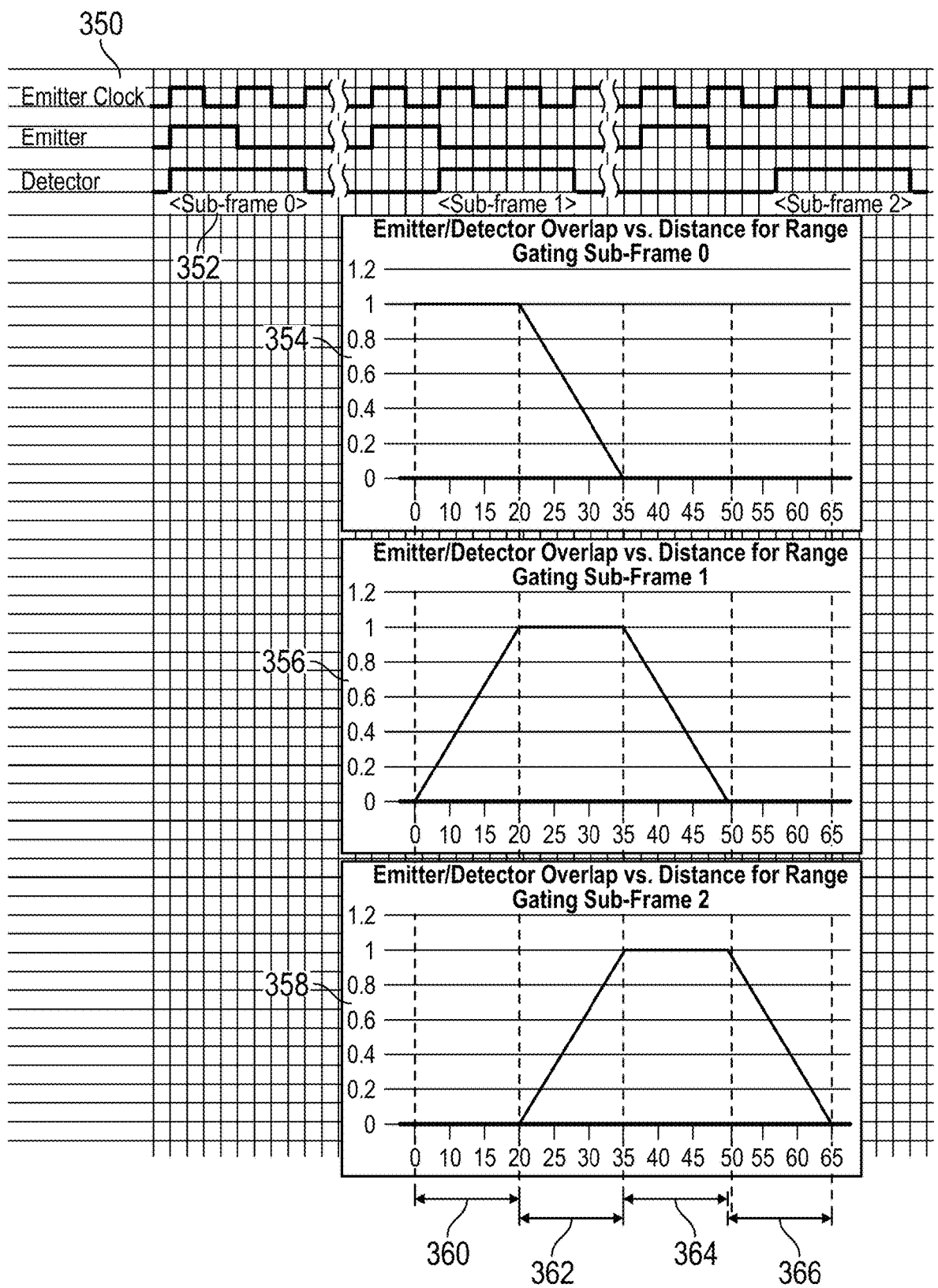
FIG. 18 illustrates the optical timing parameters for an embodiment of a non-overlapping range gating descriptor of 3/100/1/2/0.

$\Delta SF_{wp}$ is the # of sub-frames between the leading edge and trailing edge white point sub-frames In embodiments, the amplitude of the m-motion or the n-motion is computed by determining the sub-frame number at which the extrapolated high-intensity white point trapezoid slope crosses over the trailing edge black point intensity value for the other non-zero slope pixel in the m-motion or n-motion pixel triplet. Eq. 19 is modified by replacing $\Delta SF_{trapezoid-width}$ with $\Delta SF_{wp}$, and the amplitude of m-axis or n-axis motion, expressed in terms of the # of sub-frames, is computed for each pixel according to according to Eq. 25 below:

$$\Delta SF_{motion} = [(I_{te-wp}(m,n) - I_{le-wp}(m,n))^* (I_{te-bp}(m,n) - I_{le-wp}(m,n))]/\Delta SF_{wp}$$

Where $I_{te-wp}(m,n)$ is the trailing edge white point intensity value for the high-intensity pixel of a non-zero-sloped pixel triplet $I_{le-wp}(m,n)$ is the leading edge white point intensity value for the high-intensity pixel of a non-zero-sloped pixel triplet $I_{te-bp}(m,n)$ is the trailing edge black point intensity value for the low-intensity pixel of a non-zero-sloped pixel triplet $\Delta SF_{wp}$ is the # of sub-frames between the leading edge and trailing edge white point sub-frames Table 3 identifies a non-overlapping range gating waveform with a minimum of three sub-frames. In embodiments, a minimum of three sub-frames enables the determination of radiance, luminance, and distance within a single composite image. FIG. 18 illustrates the optical timing parameters for a non-overlapping range gating descriptor of 3/100/1/2/0. In embodiments, emitter and detector timing are referenced from an emitter clock 350. In accordance with the non-overlapping range gating descriptor, the sub-frame 0 detector 352 activates when the emitter activates and deactivates 100 nSec after the emitter deactivates, the sub-frame 1 detector activates 100 nSec after the emitter activates and deactivates 200 nSec after the emitter deactivates, and the sub-frame 2 detector activates 200 nSec after the emitter activates and deactivates 300 nSec after the emitter deactivates.

The Sub-frame 0 graph 354 illustrates the amount of emitter and detector overlap for various distances throughout the device range and signifies that: 1) emitter and detector experience 100% overlap for distances between 0 and 15 meters 360, 2) emitter and detector overlap decreases linearly from 100% to 0% for distances between 15 and 30 meters 362, 3) emitter and detector overlap is 0% for distances between 30 and 45 meters 364, and 4) emitter and detector overlap is 0% for distances between 45 and 60 meters 366. The Sub-frame 1 graph 356 illustrates the amount of emitter and detector overlap for various distances throughout the device range and signifies that: 1) emitter and detector overlap increases linearly from 0% to 100% for distances between 0 and 15 meters 360, 2) emitter and detector experience 100% overlap for distances between 15 and 30 meters 362, 3) emitter and detector overlap decreases linearly from 100% to 0% for distances between 30 and 45 meters 364, and 4) emitter and detector overlap is 0% for distances beyond 45 meters 366. The Sub-frame 2 graph 356 illustrates the amount of emitter and detector overlap for various distances throughout the device range and signifies that: 1) emitter and detector overlap is 0% to 100% for distances between 0 and 15 meters 360, 2) emitter and detector overlap increases linearly from 0% to 100% for distances between 15 and 30 meters 362, 3) emitter and detector experience 100% overlap for distances between 30 and 45 meters 364, 4) emitter and detector overlap decreases linearly from 100% to 0% for distances between 45 and 60 meters 366.

In embodiments, the determination of distance for each pixel (m,n) for a non-overlapping range gating optical configuration with a descriptor of 3/100/1/2/0 is illustrated in Table 6 below.

TABLE 6

| Condition Test | Distance Range | White Point | Black Point | Distance |
|---|---|---|---|---|
| $I_0(m, n) > I_1(m, n)$? | 0 m < d(m, n) < 15 m | $I_0(m, n)$ | $I_2(m, n)$ | Eq. 26 |
| $I_1(m, n) > I_0(m, n)$ & $I_1(m, n) > I_2(m, n)$? | 15 m < d(m, n) < 30 m | $I_1(m, n)$ | Eq. 27 | Eq. 28 |
| $I_2(m, n) > I_1(m, n)$ & $I_1(m, n) > I_0(m, n)$? | 30 m < d(m, n) < 45 m | $I_2(m, n)$ | $I_0(m, n)$ | Eq. 29 |
| $I_2(m, n) > I_1(m, n)$ & $I_1(m, n) = I_0(m, n)$? | 45 m < d(m, n) < 60 m | $>I_2(m, n)$ | $I_0(m, n)$ | Eq. 30 |
| $I_2(m, n) = I_1(m, n) = I_0(m, n)$? | d(m, n) > 60 m | n/a | $I_0(m, n)$ | Eq. 31 |

In embodiments, when $I_0(m,n) > I_1(m,n)$ the object at pixel (m,n) is in the range 0 m<d(m,n)<15 m and $I_1(m,n)$ determines the actual distance according to:

$$d(m,n) = \{[(I_1(m,n) - I_2(m,n))/(I_0(m,n) - I_2(m,n))] * C * P_{emitter}\}/2 \quad \text{Eq. 26}$$

Where $I_0(m,n)$ is the sub-frame 0 intensity value and the white point value for pixel (m,n)

$I_1(m,n)$ is the sub-frame 1 intensity value for pixel (m,n)
$I_2(m,n)$ is the sub-frame 2 intensity value and the black point value for pixel (m,n)
C is a constant for the speed of light in a medium
$P_{emitter}$ is the emitter clock period In embodiments, when $I_1(m,n) > I_0(m,n)$ & $I_1(m,n) > I_2(m,n)$ the object at pixel (m,n) is in the range 15 m<d(m,n)<30 m and the black point value is determined according to:

$$BP(m,n) = (I_1(m,n) - I_0(m,n)) + (I_1(m,n) - I_2(m,n)) \quad \text{Eq. 27}$$

Where $I_0(m,n)$ is the sub-frame 0 intensity value for pixel (m,n)
$I_1(m,n)$ is the sub-frame 1 intensity value and the white point value for pixel (m,n)
$I_2(m,n)$ is the sub-frame 2 intensity value for pixel (m,n)

In embodiments, when $I_1(m,n) > I_0(m,n)$ & $I_1(m,n) > I_2(m,n)$ the object at pixel (m,n) is in the range 15 m<d(m,n)<30 m and the actual distance is computed according to:

$$d(m,n) = \{[1 + (I_2(m,n) - BP(m,n))/(I_1(m,n) - BP(m,n))] * C * P_{emitter}\}/2 \quad \text{Eq. 28}$$

Where $I_1(m,n)$ is the sub-frame 1 intensity value and the white point value for pixel (m,n)
$I_2(m,n)$ is the sub-frame 2 intensity value for pixel (m,n)
BP(m,n) is the black point value for pixel (m,n) from Eq. 26
C is a constant for the speed of light in a medium
$P_{emitter}$ is the emitter clock period In embodiments, when $I_2(m,n) > I_1(m,n)$ & $I_1(m,n) > I_0(m,n)$ the object at pixel (m,n) is in the range 30 m<d(m,n)<45 m and the actual distance is computed according to:

$$d(m,n) = \{[2 + (I_2(m,n) - I_1(m,n))/(I_2(m,n) - I_0(m,n))] * C * P_{emitter}\}/2 \quad \text{Eq. 29}$$

Where $I_0(m,n)$ is the sub-frame 0 intensity value and the black point value for pixel (m,n)
$I_1(m,n)$ is the sub-frame 1 intensity value for pixel (m,n)
$I_2(m,n)$ is the sub-frame 2 intensity value and the white point value for pixel (m,n)
C is a constant for the speed of light in a medium
$P_{emitter}$ is the emitter clock period In embodiments, when $I_2(m,n) > I_1(m,n)$ & $I_1(m,n) = I_0(m,n)$ the black point value is determined as $I_0(m,n)$ and the white point value is undermined. Without knowledge of the white point the distance to the object at pixel (m,n) is in the range 45 m<d(m,n)<60 m and is determined according to:

$$(3 * C * P_{emitter})/2 > d(m,n) > (3 * C * P_{emitter})/2 \quad \text{Eq. 30}$$

In embodiments, when $I_2(m,n) = I_1(m,n) = I_0(m,n)$ the black point value is determined as $I_0(m,n)$ and the white point value is undermined. Without knowledge of the white point the distance to the object at pixel (m,n) is in the range d(m,n)>60 m and is determined according to:

$$d(m,n) > (4 * C * P_{emitter})/2 \quad \text{Eq. 31}$$

Increasing the number of sub-frames in a non-overlapping range gating configuration increases the number of ranges for which distances are determined. Increasing the period of the emitter clock increases the range of each range gating cycle. In embodiments, the maximum ranges for which pixel distances are determined for varying numbers of range gating cycles at varying emitter clock periods is expressed as:

$$\text{Range}_{max} = (N_{RG} * C * P_{emitter})/2 \quad \text{Eq. 32}$$

Where $N_{RG}$ is the number of non-overlapping range gating sub-frames
C is a constant for the speed of light in a medium
$P_{emitter}$ is the emitter clock period In embodiments, with a speed of light expresses as 0.299792 m/nSec, the maximum ranges for combinations of sub-frame numbers and emitter clock periods are shown in Table 7 below.

TABLE 7

| Number of Range Gate Sub-frames | Emitter Clock Period | Max Range |
|---|---|---|
| 3 | 50 nSec | 22.5 m |
| 4 | 50 nSec | 30.0 m |
| 5 | 50 nSec | 37.5 m |
| 3 | 100 nSec | 45.0 m |
| 4 | 100 nSec | 60.0 m |
| 5 | 100 nSec | 74.9 m |
| 3 | 100 nSec | 89.9 m |
| 4 | 100 nSec | 119.9 m |
| 5 | 100 nSec | 149.9 m |

High-dynamic-range imaging (HDR) imaging is a technique used in imaging to reproduce a greater dynamic range of luminosity than what is possible with standard digital imaging techniques, such as many real-world scenes containing very bright, direct sunlight to extreme shade. HDR is often achieved by capturing and then combining several different, narrower-range exposures of the same subject matter. Non-HDR cameras take images with a limited exposure range, referred to as low-dynamic-range (LDR), resulting in the loss of detail in highlights or shadows. HDR images typically require little or motion by a camera or by objects within a scene. Table 3 identifies an eXtended Dynamic Range (XDR) waveform with a minimum of three sub-frames. In embodiments, sub-frames are collected at three different exposures with photodetectors that exhibit a linear response to an incident number of photons. Intensity levels for the three or more XDR sub-frames are expressed as $I_0$, $I_1$ through where the intensity values are the response to three or more exposure levels, typically measured in number of microseconds.

In embodiments, the fill rate of an XDR cycle expresses how rapidly a pixel's intensity increases to a unit increase in exposure time. For a three sub-frame XDR cycle, the fill rate for sub-frames one and two for each pixel is expressed as:

$$\text{FillRate}_{1-2} = [I_2(E_2) - I_1(E_1)]/E_2 - E_1 \quad \text{Eq. 33}$$

Where $I_2$ is the intensity for sub-frame 2
$E_2$ is the exposure time that produced 12
$I_1$ is the intensity level for $I_1$
$E_1$ is the exposure time that produced $I_1$ For a three sub-frame XDR cycle, the fill rate for sub-frames zero and one for each pixel is expressed as:

$$\text{FillRate}_{0-1} = [I_1(E_1) - I_0(E_0)]/E_1 - E_0 \quad \text{Eq. 34}$$

Where $I_1$ is the intensity for sub-frame 1
$E_1$ is the exposure time that produced $I_1$
$I_0$ is the intensity level for $I_0$
$E_0$ is the exposure time that produced $I_0$ The XDR intensity level for each pixel for sub-frames one and two is expressed as:

$$I_{XDR}(E_{XDR}) = \text{FillRate}_{1-2} * (E_{XDR} - E_2) \quad \text{Eq. 35}$$

Where $E_{XDR}$ is the exposure level for which XDR is computed
$E_2$ is the sub-frame 2 exposure time The XDR intensity level for each pixel for sub-frames zero and one is expressed as:

$$I_{XDR}(E_{XDR}) = *\text{FillRate}_{0-1} * (E_{XDR} - E_1) \quad \text{Eq. 36}$$

Where $E_{XDR}$ is the exposure level for which XDR is computed
$E_1$ is the sub-fame 1 exposure time For purposes of describing the various embodiments, the following terminology and references may be used with respect to reflective articles or materials in accordance with one or more embodiments as described.

"Lighting-invariant imaging" describes a multi-frame, composite imaging system whereby maximum pixel intensity values and minimum pixel intensity values are determined for successive frames that constitute a composite image.

"Black Point" refers to a frame pixel intensity value or a frame of pixels whereby there existed no active light source or a low level of active light projected onto a scene during the photodetector integration time. The term black point is equivalent to the minimum pixel intensity in a Lighting-invariant imaging system.

"White Point" refers to a frame pixel intensity value or a frame of pixels whereby there existed an active light projected onto a scene during photodetector integration time, whereby the intensity of the light or the duration of the on time was greater than the intensity or the duration of the associated black point intensity or duration. The term white point is equivalent to the maximum pixel intensity in a Lighting-invariant imaging system.

"Luminance" describes the amount of radiant flux emitted or reflected by a surface per unit projected area due to one or more ambient light sources, and is expressed in Watts/m².

"Radiance" describes the amount of radiant flux emitted or reflected by a surface per unit projected area due to a directed light source, and is expressed in Watts/m².

"Spherical Coordinate System" is a three-dimensional coordinate space used for description of locations relative to a known point on a vehicle or an imaging component. Spherical coordinates are specified as (ρ,θ,φ), where ρ specifies distance, θ specifies the vertical angle, and φ specifies the horizontal or azimuth angle.

"Photodetector Accumulation Cycle" refers to accumulation of charge by a photodetector for an accumulation duration followed by the transfer of accumulated photodetector charge to a storage element.

"Multiple Accumulation" refers to a process whereby more than one photodetector accumulation cycle is performed within a photodetector sub-frame event. The amplitude of collected charge at a storage element is the sum of the accumulated photodetector charges that are transferred to the storage element within a multiple accumulation cycle.

"Frame" describes the electrical data produced by an imaging element like a focal plane array whereby optical information is converted to electrical information for a multi-pixel device or system. Frame information is post-processed in an imaging system to convert a single frame to an image. Focal plane arrays typically specify a capture and transfer rate by utilizing a term like frames per second.

"Sub-frame" describes the electrical data produced by an imaging element like a focal plane array whereby optical information is converted to electrical information for a multi-pixel device or system. Sub-frame information is post-processed in an imaging system to convert multiple sub-frames to a composite image or multiple composite images.

A "sub-frame trapezoidal descriptor" defines the electro-optical parameters of a sub-frame composite imaging cycle whereby the timing relationship of an emitter and a detector is different for subsequent sub-frames within an imaging duration, with the descriptor defined by a format:

<# of sub-frames>/
<emitter clock period (in nSec)>/
<# of emitter clock periods for emitter pulses>/
<# of emitter clock periods for detector integration>/
<# of emitter clock periods between end of integration and start of
    emitter pulse for sub-frame 0>
<sub-frame period duration, defined as the elapsed time from the
    start of a sub-frame to the start of a subsequent sub-frame within
    an imaging cycle (in μSec)>.

A "sub-frame WP/BP descriptor" defines the electro-optical parameters of a sub-frame composite imaging cycle whereby white point sub-frames and black point sub-frames are produced alternately throughout the imaging window, with the descriptor defined by a format:

<# of sub-frames>/
<sub-frame period duration, defined as the elapsed time from the
    start of a sub-frame to the start of a subsequent sub-frame within
    an imaging cycle (in μSec)>.

"Range Gating" describes an active sensor imaging technique that allows for the imaging of an object within a distance band from a sensor. In range-gated imaging, a pulsed light source is used to illuminate a scene while reflected light is detected by a sensor with a short exposure time or a short integration time referred to as a gate. The gate is delayed so imaging occurs at a particular range from the sensor.

"Non-overlapping range gating" describes the use of multiple range gates in a sub-frame, composite imaging system whereby the maximum distance of a range gate equates to the minimum distance of a subsequent range gate. Non-overlapping range-gating composite imagery requires a minimum of two sub-frames per composite image.

A "sub-frame non-overlapping range gating descriptor" defines the electro-optical parameters of a sub-frame composite imaging cycle whereby the timing relationship of an emitter and a detector is different for subsequent sub-frames within an imaging duration, and whereby there exists no overlap between the range at which the maximum intensity of one sub-frame range overlaps with the maximum intensity of a previous or subsequent sub-frame within a composite image, with the descriptor defined by a format:

```
<# of sub-frames>/
<emitter clock period (in nSec)>/
<# of emitter clock periods for emitter pulses>/
<# of emitter clock periods for detector integration>/
<# of emitter clock periods between start of integration and start of
    emitter pulse for sub-frame 0>.
```

Persons of ordinary skill in the relevant arts will recognize that embodiments may comprise fewer features than illustrated in any individual embodiment described above. The embodiments described herein are not meant to be an exhaustive presentation of the ways in which the various features of the embodiments may be combined. Accordingly, the embodiments are not mutually exclusive combinations of features; rather, embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of Section 112, sixth paragraph of 35 U.S.C. are not to be invoked unless the specific terms "means for" or "step for" are recited in a claim.

The invention claimed is:

1. An imaging system configured to generate a composite image depth map of a scene, the imaging system comprising:
    at least one emitter configured to emit an active light pulse toward the scene;
    an array of sub-frame imaging pixels, wherein each sub-frame imaging pixel includes a detector and at least three analog memory components configured to receive light that includes some of the active light pulse reflected from the scene for a field of view that includes at least a portion of the scene, each detector in the array of sub-frame imaging pixels configured to produce an analog response to a number of incident photons of light;
    control circuitry operably coupled to the at least one emitter and the array of sub-frame imaging pixels and configured to cause the at least one emitter to emit the active light pulse and to cause the array of sub-frame imaging pixels to receive light to store at least three successive sub-frames of analog stored charge values within the at least three analog memory components, wherein each sub-frame has a timing relationship of an emitter/detector cycle for that sub-frame that enables the at least three successive sub-frames to be utilized for range gating of an image of the scene in different distance bands from the array of sub-frame imaging pixels; and
    a processing system operably coupled to the control circuitry and the at least three analog memory components to generate the composite image depth map of the scene, the processing system configured to:
        analyze the at least three successive sub-frames of analog stored charge values to determine for a sub-frame imaging pixel a black point, a white point, and the one of the at least three successive sub-frames at which the white point occurs; and
        determine a distance for each sub-frame imaging pixel based on the one of the at least three successive sub-frames at which the white point occurs.

2. The imaging system of claim 1 wherein the distance for each sub-frame imaging pixel is defined by an overlap in a duration of the timing relationship of the emitter/detector cycle for that sub-frame imaging pixel.

3. The imaging system of claim 2 wherein a total distance range of the imaging system is equal to a number of sub-frames per sub-frame imaging pixel multiplied by the distance for each sub-frame pixel.

4. The imaging system of claim 1 wherein the imaging system is mounted in a vehicle capable of moving at speeds of more than 50 km/hour and all of the at least three successive sub-frames for each sub-frame imaging pixel are stored within an imaging window less than 250 µSec.

5. The imaging system of claim 1 wherein the imaging system is mounted in a handheld device and the at least three successive sub-frames for each sub-frame imaging pixel are stored within an imaging window of less than 2500 µSec.

6. The imaging system of claim 1 wherein the processing system, the array of detectors, the control circuitry and the processing system are integrated on a single electronic device.

7. The imaging system of claim 1 wherein the processing system the array of detectors and the control circuitry are integrated on a single electronic device and the processing system is external to the single electronic device.

8. The imaging system of claim 1 wherein a distance to an object represented by a sub-frame imaging pixel is determined by an equation that is unique for a distance range for the one of the at least three successive sub-frames at which the white point occurs.

9. The imaging system of claim 1 wherein the active light pulse in a given emitter/detector cycle for a given sub-frame imaging pixel comprises:
    a number of pulses selected from the set consisting of a single pulse for each of the at least three successive sub-frames, a sequence of multiple pulses for each of the at least three successive sub-frames, a single pulse per sub-frame, or multiple pulses per sub-frame, and a frequency selected from the set consisting of a single frequency range or multiple frequency ranges.

10. The imaging system of claim 1 wherein the array of sub-frame imaging pixels is configured to accumulate light based on a single accumulation for the timing relationship of the emitter/detector cycle that is unique for each sub-frame.

11. The imaging system of claim 1 wherein the array of detectors is configured to accumulate light based on a plurality of accumulations for the timing relationship of the emitter/detector cycle that is the same for each sub-frame.

12. The imaging system of claim 1, wherein an analog memory component is selected from a set that includes a capacitor, a switched-current memory, and an analog shift register.

* * * * *